(12) United States Patent
Banar

(10) Patent No.: US 12,297,920 B2
(45) Date of Patent: May 13, 2025

(54) VENT SYSTEM FOR PROTECTION FROM MOISTURE

(71) Applicant: Oleg T. Banar, Seattle, WA (US)

(72) Inventor: Oleg T. Banar, Seattle, WA (US)

(73) Assignee: Oleg T. Banar, Seattle, WA (US)

(*) Notice: Subject to any disclaimer, the term of this patent is extended or adjusted under 35 U.S.C. 154(b) by 416 days.

(21) Appl. No.: 17/689,847

(22) Filed: Mar. 8, 2022

(65) Prior Publication Data

US 2023/0146203 A1 May 11, 2023

Related U.S. Application Data

(60) Provisional application No. 63/306,354, filed on Feb. 3, 2022, provisional application No. 63/277,023, filed on Nov. 8, 2021.

(51) Int. Cl.
*F16K 24/04* (2006.01)
*B60H 1/00* (2006.01)
(Continued)

(52) U.S. Cl.
CPC ............ *F16K 24/044* (2013.01); *B60H 1/249* (2013.01); *B63J 2/02* (2013.01)

(58) Field of Classification Search
CPC ... F16K 24/044; B60H 1/262; B60H 1/00364; B60H 1/249; B63B 19/04; B63J 2/04
See application file for complete search history.

(56) References Cited

U.S. PATENT DOCUMENTS 1,672,042 A 6/1928 Schmidt
1,851,084 A 3/1932 Brown et al.
(Continued)

FOREIGN PATENT DOCUMENTS

EP 0957024 11/1999
EP 1130298 9/2001
(Continued)

OTHER PUBLICATIONS

The International Searching Authority, "Search Report and Written Opinion" in application No. PCT/US2022/079050, Feb. 1, 2023, 15 pages.

*Primary Examiner* — Steven S Anderson, II
(74) *Attorney, Agent, or Firm* — Davis Wright Tremaine LLP

(57) ABSTRACT

A ventilation system is provided for persistent natural ventilation by circulation of air between an interior space and an external environment. In one example, the ventilation system includes an air intake including a domed upper cover with exterior windows which allow air to circulate through an upper chamber, a baffle around floatable elements, the baffle including an annular protective screen and valve windows, a lower chamber fluidly coupled to each of the upper chamber via the baffle and an interior duct via a main window thereof, wherein the interior duct is fluidly coupled to the interior space, and wherein the floatable elements are positioned on respective seats when no liquid is present, each of the seats spaced a distance opposite to a respective one of the valve windows. Responsive to liquid entering the upper chamber via the exterior windows, the valve windows may be automatically blocked by the floatable elements.

20 Claims, 21 Drawing Sheets

(51) Int. Cl.
  *B60H 1/26* (2006.01)
  *B63J 2/04* (2006.01)
  B60H 1/24 (2006.01)
  B63J 2/02 (2006.01)

(56) References Cited

U.S. PATENT DOCUMENTS

| | | | |
|---|---|---|---|
| 2,711,126 A | 6/1955 | Atkinson | |
| 3,311,043 A | 3/1967 | Atkinson | |
| 3,366,028 A | 1/1968 | Back | |
| 3,620,240 A | 11/1971 | Bogdanski | |
| 3,741,100 A | 6/1973 | Beck | |
| 3,779,149 A | 12/1973 | Bernard, Jr. | |
| 3,796,180 A | 3/1974 | Ebbighausen | |
| 3,858,603 A * | 1/1975 | Lenz | F16K 24/00 137/433 |
| 4,050,363 A | 9/1977 | Fuerst | |
| 4,241,645 A | 12/1980 | le Comte | |
| 4,307,655 A | 12/1981 | Parks et al. | |
| 4,448,112 A * | 5/1984 | Soderberg | B63J 2/02 114/211 |
| 4,535,715 A | 8/1985 | McIntosh | |
| 4,579,140 A | 4/1986 | Sekine | |
| 5,339,759 A | 8/1994 | Peabody | |
| D365,873 S | 1/1996 | Van Belle | |
| 6,447,565 B1 | 9/2002 | Raszkowski et al. | |
| 6,612,924 B1 | 9/2003 | Mantyla et al. | |
| 6,699,118 B1 | 3/2004 | Wahner et al. | |
| D491,257 S | 6/2004 | Picken, Jr. | |
| 6,938,631 B2 | 9/2005 | Gridley | |
| 7,195,602 B2 | 3/2007 | Yong et al. | |
| D581,032 S | 11/2008 | Parry | |
| D636,069 S | 4/2011 | LeMay et al. | |
| D636,482 S | 4/2011 | LeMay et al. | |
| D665,491 S | 8/2012 | Goel et al. | |
| 8,448,663 B2 * | 5/2013 | Jakubowski | F16K 15/063 137/526 |
| 9,120,550 B2 | 9/2015 | Hopper et al. | |
| D775,721 S | 1/2017 | Müller et al. | |
| D776,250 S | 1/2017 | Müller et al. | |
| D778,423 S | 2/2017 | Buzanowski et al. | |
| D792,571 S | 7/2017 | Buzanowski et al. | |
| D807,494 S | 1/2018 | Kim et al. | |
| D817,254 S | 5/2018 | Gridley | |
| D843,558 S | 3/2019 | Andersson | |
| D894,366 S | 8/2020 | Gebert et al. | |
| D993,385 S | 7/2023 | Bullock et al. | |
| 2003/0230330 A1 | 12/2003 | Gridley | |
| 2006/0199493 A1 | 9/2006 | Hartmann et al. | |
| 2007/0015450 A1 | 1/2007 | Bickel et al. | |
| 2009/0270024 A1 | 10/2009 | Buck | |
| 2011/0192436 A1 | 8/2011 | Gridley | |
| 2011/0280502 A1 | 11/2011 | Meike | |
| 2012/0025123 A1 * | 2/2012 | Ericson | E03C 1/122 251/359 |
| 2014/0020799 A1 | 1/2014 | Gridley | |
| 2021/0284315 A1 | 9/2021 | Michaeli et al. | |

FOREIGN PATENT DOCUMENTS

| | | |
|---|---|---|
| JP | 1601065 S | 4/2018 |
| KR | 101013097 | 2/2011 |
| KR | 301215543.0000 | 5/2023 |
| KR | 301219498.0000 | 6/2023 |
| NO | 8200336 | 2/1982 |
| WO | 2007122308 A2 | 11/2007 |

* cited by examiner

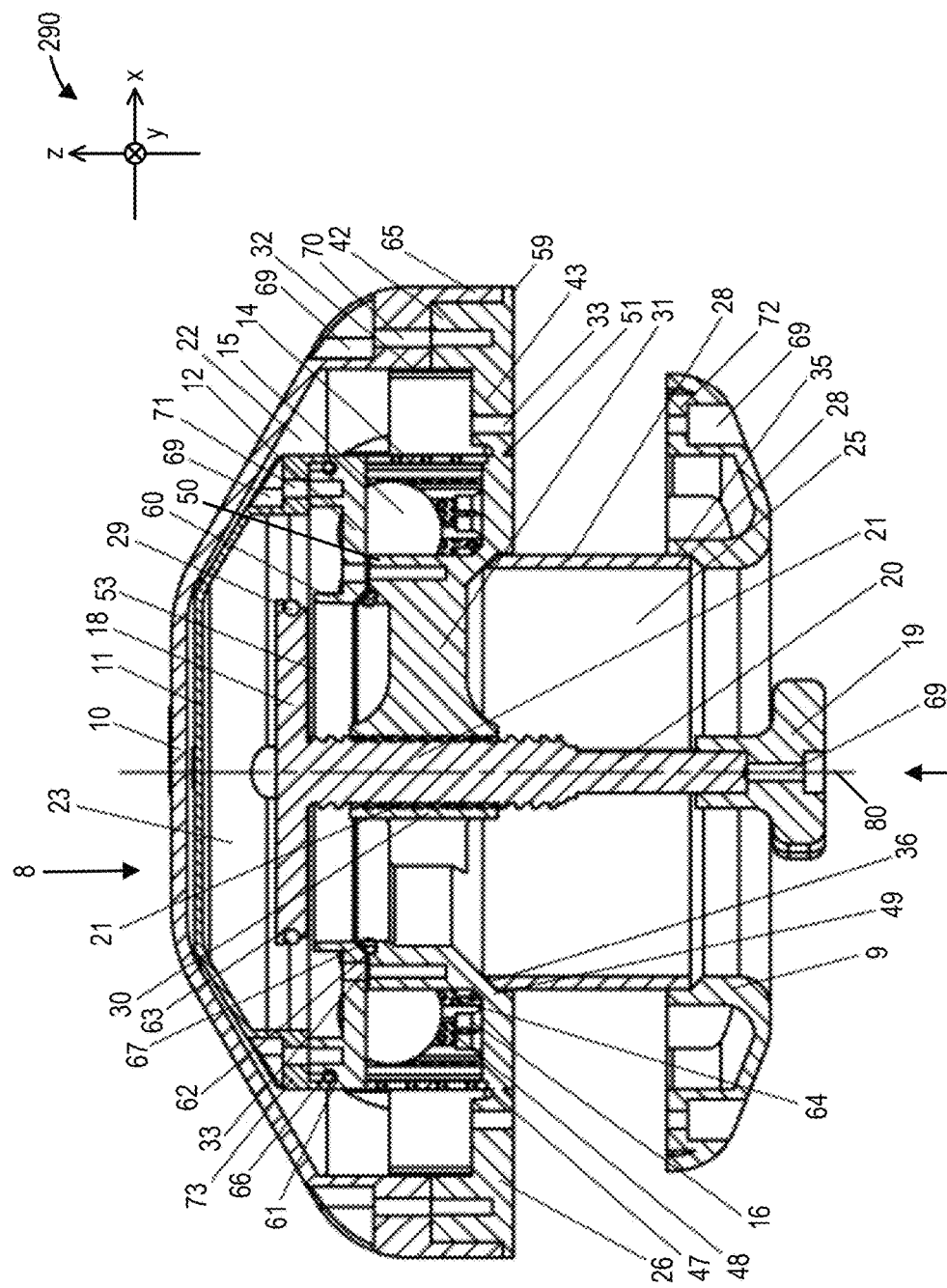

VENT SYSTEM FOR PROTECTION FROM MOISTURE

CROSS-REFERENCE TO RELATED APPLICATIONS

The present application claims priority to each of U.S. Provisional Application No. 63/277,023, entitled "VENT SYSTEM FOR PROTECTION FROM MOISTURE" and filed on Nov. 8, 2021, and U.S. Provisional Application No. 63/306,354, entitled "VENT SYSTEM FOR PROTECTION FROM MOISTURE" and filed on Feb. 3, 2022. The entire contents of each of the above-identified applications are hereby incorporated by reference for all purposes.

FIELD

Embodiments of the subject matter disclosed herein relate to air ventilation systems operable to direct air flow between an external environment and one or more internal compartments while preventing any amount of liquid from entering the one or more internal compartments.

BACKGROUND

Persistent natural ventilation for interior spaces (e.g., of watercraft or other vehicles) may prevent biological accumulation (e.g., molds, algae, etc.) therein, as well as moisture-induced degradation. Problematically, some valves, while providing continuous air flow, may be unable to prevent at least small amounts of water from entering such interior spaces. Moreover, though purported solutions exist or have existed on the market or otherwise in the art, each of these solutions are deficient in one or more aspects.

For example, watertightness of certain interior spaces (such as compartments or engine rooms, sometimes referred to as "dry zones" or "dry storages") of a facility or a vehicle (e.g., road or rail vehicle, watercraft, etc.) may be increased to control for (e.g., decrease) ambient humidity therein and/or other liquid entry. Moreover, during ventilation of such interior spaces, dryness/clearness of air entering the interior space may be increased and/or an internal temperature may be controlled to mitigate moisture accumulation. Such ventilation typically leverages one or more protruding vents, such as higher (e.g., deck level) horizontally extending windows ("hatches"), to reduce a risk of the one or more protruding vents from becoming flood points.

To prevent liquid entry, in certain systems, such vents may be configured to only include automated shutters. In other systems, liquid entry may be prevented by configuring the vents with manual shutters. In yet other systems, neither automatic nor manual shutters may be provided and the vents may function as typical air circulation ducts (e.g., without actively controlling air flow therethrough). In yet other systems, metal valves or valves with metal components may be implemented which may corrode or otherwise degrade in extreme environments, such as environments with relatively high salinity and/or relatively high humidity. In yet other systems, various other deficiencies may be present, such as being provided with only one conduit for entering/exiting air, having a non-smoothed external surface which may interfere with other systems (e.g., a rope or hook may inadvertently attach to the external surface), and/or having an external surface with a relatively large surface area (which may increase a chance of being compressed under force from a foot or another relatively heavy object).

BRIEF DESCRIPTION OF THE DRAWINGS

Various embodiments and techniques will be described with reference to the drawings, in which:

FIG. 3 shows a cross-sectional view of an air ventilation system, in accordance with at least one embodiment;

DETAILED DESCRIPTION

Figure 1A:
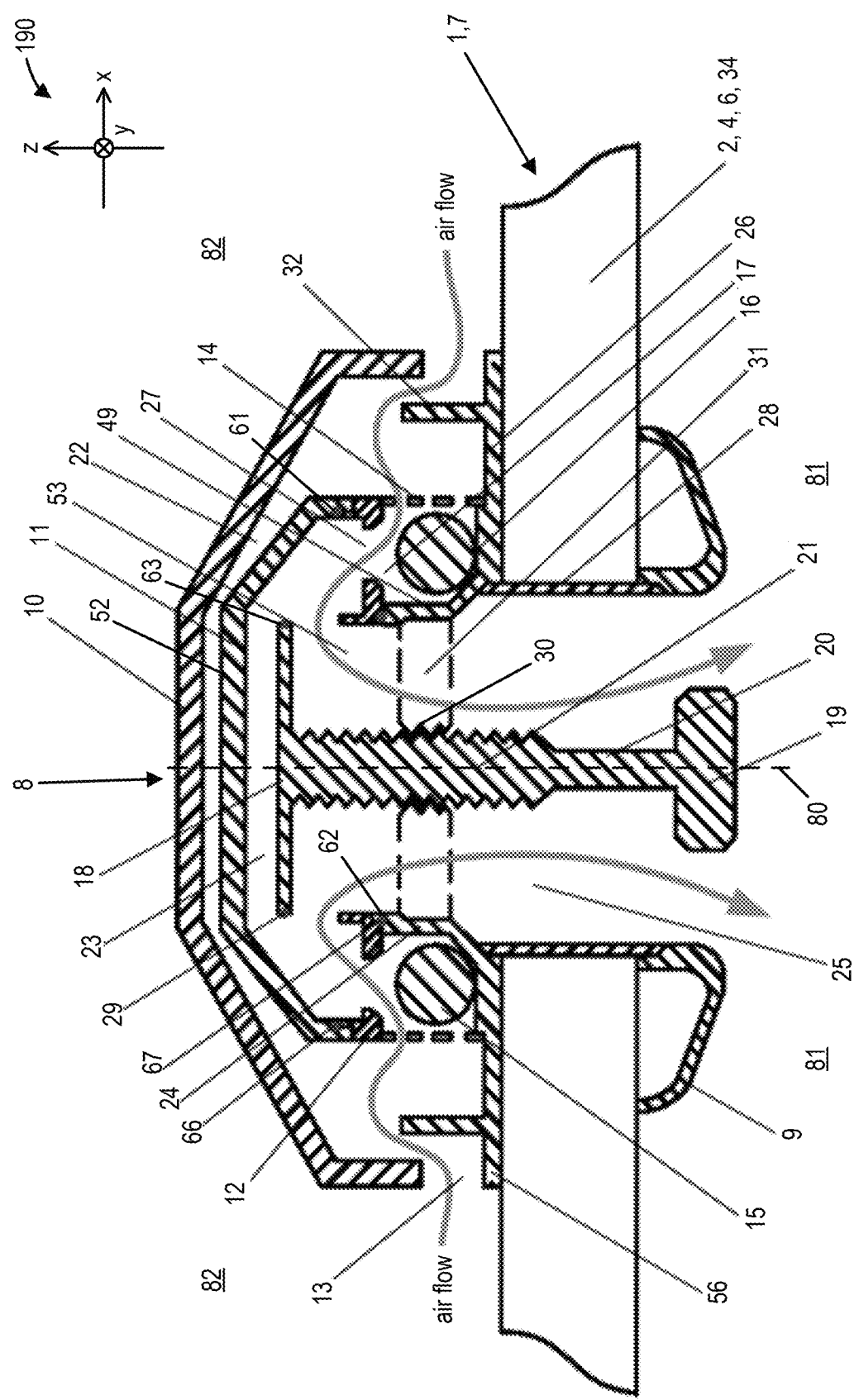
FIG. 1A shows a simplified cross-sectional view of an air ventilation system in a first state, the first state including a manual shutter in an open position and floatable elements in a resting position, in accordance with at least one embodiment.

Techniques described and suggested herein include air ventilation system, including an interior duct, a frame circumscribing the interior duct, an upper cover coupled to the frame, a plurality of exterior air windows formed between the frame and the upper cover, and a valve subsystem at least partially housed within the upper cover and the frame, the valve subsystem in fluidic communication with the plurality of exterior air windows and the interior duct during at least one mode of operation of the air ventilation system, wherein the valve subsystem is configured to permit continuous air flow from the plurality of exterior air windows through to the interior duct and prevent liquid flow from reaching the interior duct during at least one mode of operation of the air ventilation system.

A method for controlling air and liquid flows between an external environment and an interior space of an object, in accordance with various embodiments, includes installing an air ventilation system on a surface of the object, the air ventilation system configured to permit fluidic communication between the external environment and the interior space, responsive to at least a threshold amount of liquid flowing into the air ventilation system, automatically sealing a valve subsystem of the air ventilation system such that none of the liquid reaches the interior space, and responsive to less than the threshold amount of liquid flowing into the air ventilation system, permitting air to flow into the interior space while preventing the liquid from reaching the interior space.

A vehicle, in accordance with various embodiments, includes a cover which is periodically exposed to precipitation, seawater, and/or freshwater, the cover including one or more apertures therethrough and enclosing an interior space, the interior space sealed from an external environment excepting for the one or more apertures, and an air ventilation system removably fastened to a first aperture of the one or more apertures, the air ventilation system sealing the first aperture such that, at the first aperture, the interior space is only able to be in fluidic communication with the external environment via the air ventilation system, wherein a valve subsystem of the air ventilation system permits persistent natural air ventilation of the interior space excepting during a first mode of operation of the air ventilation system when a liquid flow is present within the air ventilation system and a manual shutter of the valve subsystem is in an open position and during a second mode of operation of the air ventilation system when the manual shutter is in a closed position, where the first and second modes of operation do not occur contemporaneously.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

For example, the following description relates to various embodiments of an air ventilation system which permits persistent, natural (e.g., ambient) air circulation along multiple flow paths. In an example embodiment, the air ventilation system may be relatively compact, lightweight, durable, and structurally sound, with relatively smooth and high-strength external surfaces. Additionally or alternatively, the air ventilation system may be relatively easy to manufacture and assemble [e.g., via additive manufacturing or three-dimensional (3D) printing] and may be configured so as to facilitate installation in a range of vehicles (e.g., road or rail vehicles, watercraft, etc.), waterproof or water-resistant covers, etc. In one embodiment, the air ventilation system includes an air duct which is both automatically and manually restrictable/closable so as to provide at least some redundancy to prevent any amount of water from flowing therethrough.

In an example embodiment, the air ventilation system may maintain persistent, natural air circulation between an external environment and an interior space via floatable valves. The floatable valves may be arranged to be in a fully open position (e.g., with floatable elements of the floatable valves in a resting position) in the absence of liquid flowing into a vent circuit entrance, and in a closed position (e.g., with floatable elements blocking respective valve windows) in the presence of the liquid flowing into the vent circuit entrance from any direction so as to block a ventilation passage (e.g., from the external environment to the interior space).

Accordingly, one technical effect of at least one embodiment of the air ventilation system provided herein is that persistent, natural air circulation between the external environment and the interior space may be improved while automatically blocking any amount of liquid from entering into the interior space via the ventilation passage.

In some embodiments, the air ventilation system may be implemented for ventilation of an interior space (e.g., a compartment or an engine room) of a facility or a vehicle (e.g., road or rail vehicle, watercraft, etc.) which may benefit from persistent, natural, dry air circulation and one or more of consistent internal temperature (e.g., within a threshold temperature range), moisture content less than a threshold upper limit, or prevention of water or other liquid flow through a ventilation passage (e.g., from the external environment to the interior space).

In an example embodiment, a frame may be utilized, on which may be positioned all auxiliary elements for controlling/restricting air and liquid flows, such as the floatable valve including floatable elements and a baffle. For example, the floatable valve may be configured as a ball valve. In such an example, the floatable elements may be lightweight floatable balls: sensitive and responsive to the presence of a liquid flowing into a vent circuit entrance included in the frame, yet configured to rest in respective seats in the absence of the liquid to permit air masses to circulate between the external environment and the interior space.

In an additional or alternative embodiment, a monolithic top cover may be positioned over a plurality of protective walls surrounding an annular protective screen to protect against particulates (e.g., dust, dirt, etc.) from entering a ventilation circuit at least partially enclosed by the frame. In certain embodiments, the annular protective screen may additionally prevent small invertebrates (e.g., mosquitoes and other insects, arachnids, mollusks, etc.) from entering the interior space.

In certain embodiments, the top cover may include a plurality of reinforced inner side ribs and a plurality of first fastener holes, wherein the plurality of reinforced inner side ribs may extend away from the top cover in a direction of the frame. The frame may include a plurality of second fastener holes, at least some of which may be opposite and complementary to the plurality of first fastener holes such that each complementary pair of first and second fastener holes may be aligned to receive a single respective fastener. A deflector may further be included, the deflector positioned opposite to the top cover, such that the frame may be sandwiched between the deflector and the top cover. The deflector may include a plurality of third fastener holes, with at least some of the plurality of second fastener holes being opposite and complementary to the plurality of third fastener holes such that each complementary pair of second and third fastener holes may be aligned to receive a single respective fastener. In some embodiments, a cover or other surface of the facility or the vehicle may be securely and sealingly sandwiched between the frame and the deflector upon providing the complementary pairs of second and third fastener holes with respective fasteners.

For example, four first fastener holes may pass through and be evenly spaced about a circumference of the top cover, and four second fastener holes may pass through and be evenly spaced about a circumference of the frame, each of the four second fastener holes respectively opposite to and aligned with the four first fastener holes. Further, four third fastener holes may pass through and be evenly spaced about a circumference of the deflector, and four additional second fastener holes may pass through and be evenly spaced about the frame along a first inner circle concentric with the circumference of the frame, each of the four additional second fastener holes respectively opposite to and aligned with the four third fastener holes. By providing each complementary fastener hole pair (e.g., complementary first and second fastener holes or complementary second and third fastener holes) with a fastener, the top cover, the frame, and the deflector may be securely fastened to one another via evenly distributed fasteners. Further, by sealingly sandwiching the cover or other surface of the facility or the vehicle between the frame and the deflector, the top cover, the frame, and the deflector may be positioned to control/restrict air and liquid flows into the interior space of the facility or the vehicle enclosed by the cover or other surface (e.g., one or more valves may be positioned along a ventilation circuit within the top cover, the frame, and the deflector to control/restrict the air and liquid flows).

In some embodiments, to facilitate assembly of the air ventilation system, a plurality of first frame side slots may be provided around the circumference of the frame, where the plurality of first frame side slots may respectively receive the plurality of reinforced inner side ribs of the top cover. In additional or alternative embodiments, the annular protective screen may include a plurality of inner side ribs, and a plurality of second frame side slots may be provided around a second inner circle concentric with the circumference of the frame, where the plurality of second frame side slots may respectively receive the plurality of inner side ribs of the annular protective screen.

In an example embodiment, a manual shutter may be provided within the air ventilation system, the manual shutter actuatable between closed and fully open positions (and partially open positions therebetween) via rotation along a thread. By rotating along the thread, an applied pressure may be maintained against a gasket when the manual shutter is in the closed position to seal a main window of a duct configured in the frame and thereby prevent air from entering the interior space of the facility or the vehicle.

Referring now to FIGS. 1A-1D, simplified cross-sectional views respectively depicting an air ventilation system 8 (also referred to herein as a vent system 8) in first, second, third, and fourth states are respectively shown. Specifically, the simplified cross-sectional views are taken along a plane inclusive of a central axis 80 of the air ventilation system 8, about which the air ventilation system 8 exhibits rotational symmetry. FIGS. 1A-1D depict one embodiment of the air ventilation system 8 which may be assembled and configured similarly to the embodiments depicted in FIGS. 2A-8 and which may operate in a substantially similar manner in practice (when the term "substantially" is used herein, it is meant that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide). Accordingly, excepting minor configurational differences, the description provided below with reference to FIGS. 1A-1D may be additionally applied to the embodiments depicted in FIGS. 2A-8. In certain embodiments, additional components and/or functionalities may also be included in the embodiments depicted in FIGS. 2A-8 which are not described in detail below with reference to FIGS. 1A-1D and which may be additionally applied to the embodiments depicted in FIGS. 1A-1D. Similarly, additional components and/or functionalities which are described in detail with reference to a subset of the embodiments depicted in FIGS. 2A-8 may be additionally applied to remaining embodiments depicted in FIGS. 2A-8.

A set of Cartesian coordinate axes 190 is shown in FIGS. 1A-1D for contextualizing positions of the various components of the air ventilation system 8 and for comparing between the various views of FIGS. 1A-1D. Specifically, x-, y-, and z-axes are provided which are mutually perpendicular to one another, where the x- and z-axes define a plane of the cross-sectional views shown in FIGS. 1A-1D and the y-axis is perpendicular thereto. As shown, the central axis 80 may be parallel with the z-axis.

Referring now to FIG. 1A, the air ventilation system 8 may include a frame 26, which may be of monolithic construction. In an example embodiment, the frame 26 may be configured as a main support of the air ventilation system 8 such that other components (e.g., upper cover 10, deflector 9; see below) of the air ventilation system 8 may be coupled to, or positioned relative to, the frame 26. A cross-section of the frame 26 perpendicular to the central axis 80 may be substantially circular in shape. The frame 26 may include a barrel 49 positioned at a center of the frame 26 with respect to the central axis 80 and concentric with a circumference of the frame 26.

In an example embodiment, a guide 30 may be positioned at a center of the barrel 49 with respect to the central axis 80. The guide 30 may be held in place by a plurality of holders 31 positioned within the barrel 49, the guide 30 including internal threading so as to receive external threading of a manual shutter 21. The plurality of holders 31 may extend from an inner surface of the barrel 49 to an outer surface of the guide 30 opposite an inner surface of the guide 30 including the internal threading. The plurality of holders 31 may be evenly spaced with respect to rotation about the central axis 80, e.g., in a spoked configuration. For example, three holders 31 may be evenly spaced about the central axis with angles of 120° therebetween.

In an example embodiment, the manual shutter 21 may include a cap 18, the cap 18 including a gasket slot 63 about a circumference of the cap 18 and a gasket 29 clearance fit within the gasket slot 63. The circumference of the cap 18 may be substantially equivalent to an inner circumference of the barrel 49 such that the gasket 29 may be positioned in face-sharing contact with the inner surface of the barrel 49 when the manual shutter 21 is in the closed position, thereby sealing an interior space 81 of an object 1, 7 (e.g., a facility or a watercraft or other vehicle) and preventing air (and moisture) from entering therein.

In an example embodiment, the manual shutter 21 may include a handle 20 and a knob 19 coupled to (e.g., monolithically formed with) the handle 20, the knob 19 operable to rotate the handle 20 via application of manual torque.

Specifically, to manually adjust the manual shutter 21 between the fully open position depicted in FIG. 1A (see also FIG. 1B) and the closed position (see FIGS. 1C-1D), the handle 20 may be rotated via actuation of a seat (not shown at FIG. 1A; see seat 75 of FIG. 4) with the knob 19. For example, the knob 19 may be rotated counterclockwise to adjust the manual shutter 21 from the fully open position to the closed position and the knob 19 may be rotated clockwise to adjust the manual shutter 21 from the closed position to the fully open position.

In an example embodiment, the frame 26 may include a plurality of protective baffles 32 positioned about an outer circle concentric with a circumference of the frame 26. Specifically, the plurality of protective baffles 32 may be evenly spaced along the outer circle with respect to rotation about the central axis 80 so as to mitigate solid particulates (e.g., dirt, dust, etc.) and other waste from entering the air ventilation system 8.

Figure 5:
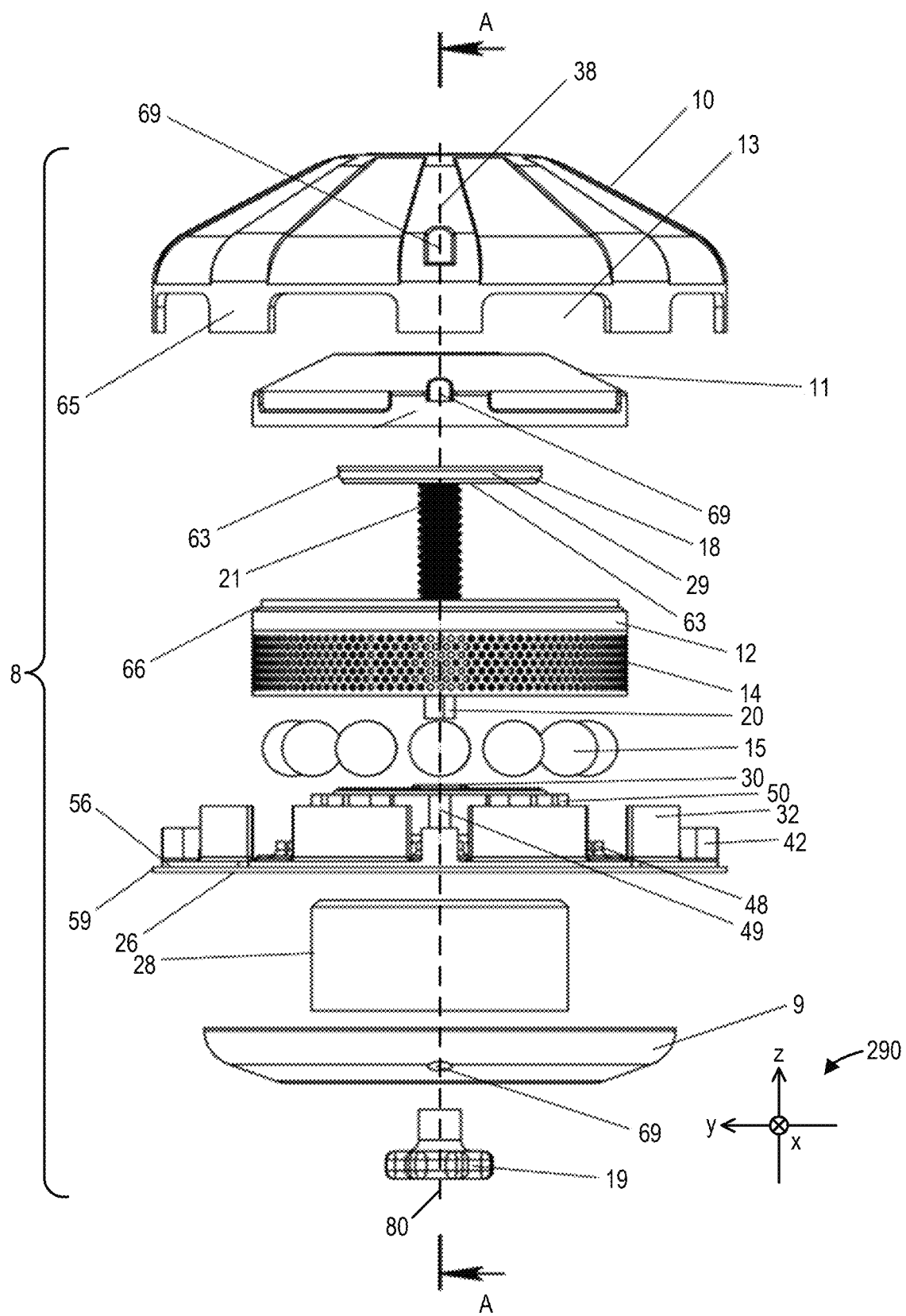
FIG. 5 shows an exploded side view of an air ventilation system, in accordance with at least one embodiment.

The air ventilation system 8 may include an upper cover 10 configured as a substantially smooth dome (optionally with a plurality of raised strips, such as reinforced top strips 38 of FIG. 5, e.g., to provide additional protection to the upper cover 10 when stepped on or impacted by a falling object) at least partially enclosing an upper chamber 22 between the upper cover 10 and a lid 11. In an example embodiment, a plurality of exterior air windows 13 may be formed between the upper cover 10 and an annular ledge 56 of the frame 26, such that the plurality of exterior air windows 13 may be positioned about the circumference of the frame 26. Specifically, the plurality of exterior air windows 13 may be evenly spaced along the circumference of the frame 26 with respect to rotation about the central axis 80. In embodiments including the upper cover 10 configured as the substantially smooth dome, the substantially smooth dome configured as an elliptical surface, air may be naturally convected through the plurality of exterior air windows 13 following an external air current in the external environment 82 induced by wind or motion of the object 1, 7.

The air ventilation system 8 may include a deflector 9 positioned so as to form a lower portion of the air ventilation system 8 (e.g., extending into the interior space 81). Specifically, the deflector 9 may be positioned on an underside of, and at least partially within, a cover (or other surface) 2, 4, 6, 34 of the object 1, 7 on which the air ventilation system 8 may be installed, the cover 2, 4, 6, 34 extending substantially perpendicularly from the central axis 80. In some embodiments wherein a thickness of the cover 2, 4, 6, 34 is less than a threshold thickness, the deflector 9 may be directly coupled to the frame 26. In other embodiments wherein the thickness of the cover 2, 4, 6, 34 is greater than the threshold thickness, the deflector 9 may be coupled to the frame 26 via an interposed ancillary air pipe 28. Specifically, a length of the ancillary air pipe 28 may be substantially equal to the thickness of the cover 2, 4, 6, 34.

The air ventilation system 8 may include a valve subsystem 52 to control or restrict water and air flow into the interior space 81. In an example embodiment, interior components within the air ventilation system 8, e.g., positioned in a central portion of the air ventilation system 8 so as to be interposed between the cover 2, 4, 6, 34 and the lid 11, may be operable to control or restrict water and air flow into the interior space 81 may be included in the valve subsystem 52. In an additional or alternative embodiment, the valve subsystem 52 may be positioned within a central portion of the frame 26 delimited by the plurality of protective baffles 32.

As shown, FIG. 1A illustrates the air ventilation system 8 in the first state, including the manual shutter 21 in an open position (e.g., in a partially open position or the fully open position) and a plurality of floatable elements 15 in a resting position. Specifically, the resting position may include the plurality of floatable elements 15 at rest in a plurality of seats 16, respectively, the plurality of seats 16 positioned opposite to a plurality of interior valve windows 27, respectively.

In an example embodiment, the plurality of interior valve windows 27 may be formed in a baffle 12 positioned at a top end of the barrel 49. In some embodiments, the baffle 12 may include an annular protective screen 14 (e.g., the annular protective screen 14 may be monolithically formed with the baffle 12), which may permit air to substantially freely circulate from an external environment 82 (e.g., through the plurality of exterior air windows 13 and the annular protective screen 14) into a valve chamber 17 at least partially surrounded by the baffle 12. In other embodiments, the annular protective screen 14 may be a separate component from the baffle 12. In such embodiments, the annular protective screen 14 may be directly couplable to the baffle 12 (e.g., the annular protective screen 14 may be removably secured to the baffle 12 without any intervening components therebetween). Moreover, in such embodiments, the annular protective screen 14 being separate from the baffle 12 may facilitate manufacturing of the air ventilation system 8 in that various configurations of the annular protective screen 14 may be interchangeably coupled to the baffle 12.

When the air ventilation system 8 is in the first state (e.g., the plurality of floatable elements 15 is in the resting position), the air within the valve chamber 17 may further flow through the plurality of interior valve windows 27 and into an underlid (or lower) chamber 23. The underlid chamber 23 may be fluidly coupled to an interior duct 25 passing through the cover 2, 4, 6, 34 (e.g., at least partially surrounded by the deflector 9 and/or the ancillary air pipe 28) via a main window 53 circumscribed by a top annular ring 60, thereby permitting the air to pass from the underlid chamber 23 through the interior duct 25 and into the interior space 81. As shown, the lid 11 and the baffle 12 may partition the underlid chamber 23 from the upper chamber 22.

Figure 1B:
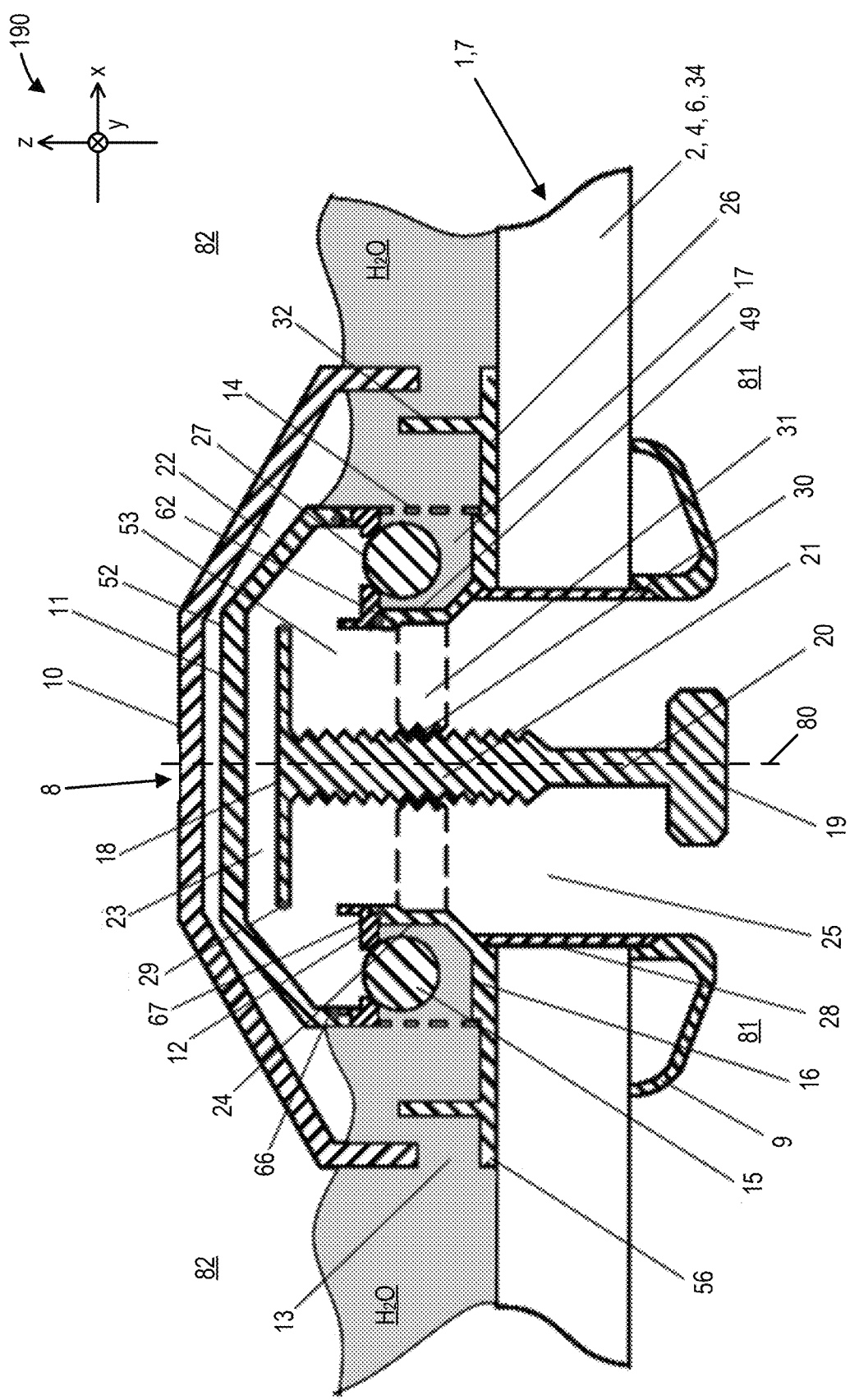
FIG. 1B shows a simplified cross-sectional view of the air ventilation system of FIG. 1A in a second state, the second state including the manual shutter in the open position and the floatable elements blocking respective interior valve windows under the influence of water, in accordance with at least one embodiment.

Referring now to FIG. 1B, the air ventilation system 8 is illustrated in the second state, including the manual shutter 21 in the open position (e.g., the partially open position or the fully open position) and the plurality of floatable elements 15 respectively blocking the plurality of interior valve windows 27 under the influence of water (e.g., each of the plurality of floatable elements 15 may have a density less than a density of water). Specifically, the water may induce the plurality of floatable elements 15 to float upwards from the plurality of seats 16 to the plurality interior valve windows 27. When the plurality of floatable elements 15 respectively block the plurality of interior valve windows 27, water and air may be prevented from circulating between the external environment 82 and the interior space 81 (even though the manual shutter 21 is in the open position in the second state).

Figure 1C:
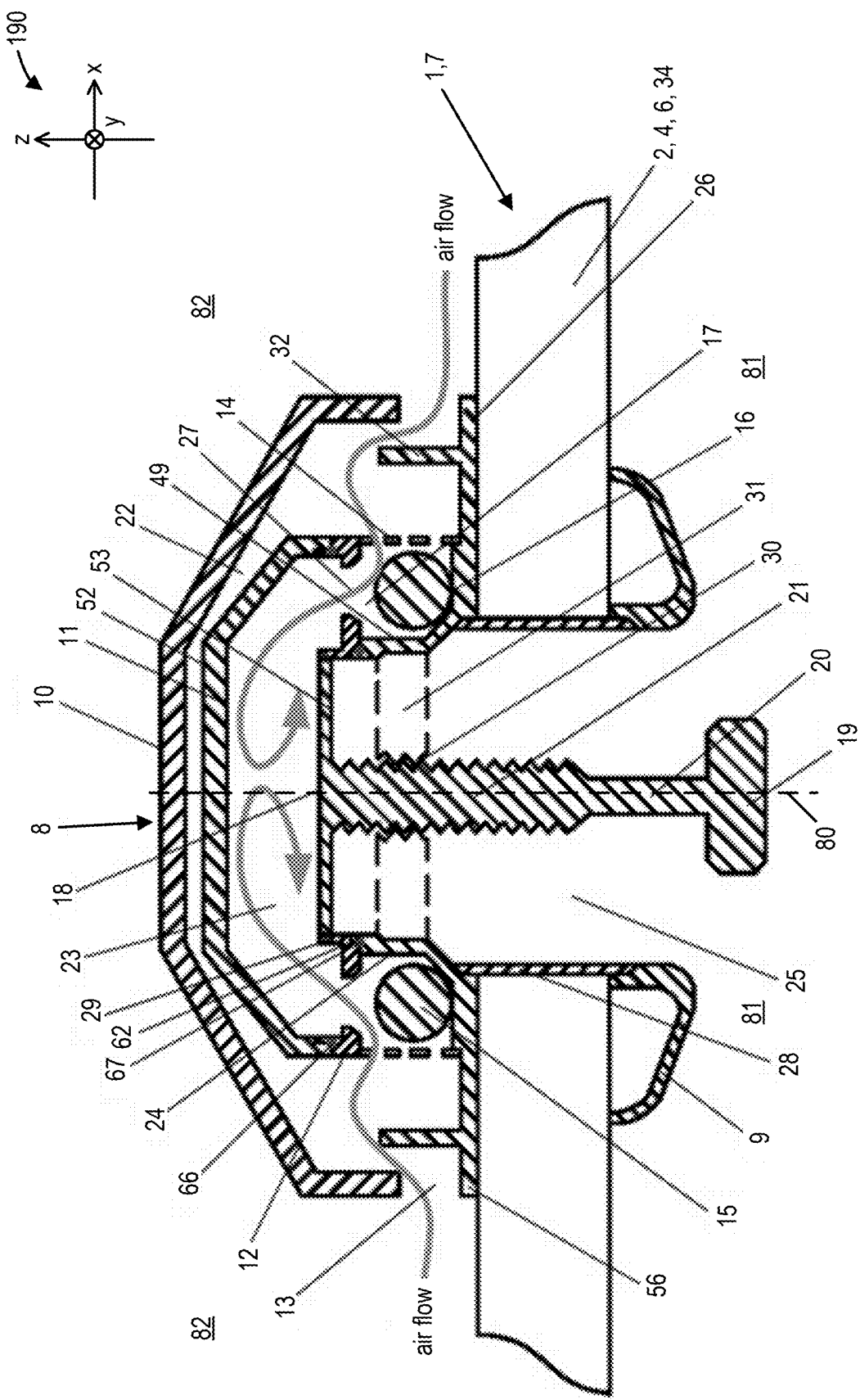
FIG. 1C shows a simplified cross-sectional view of the air ventilation system of FIG. 1A in a third state, the third state including the manual shutter in a closed position and the floatable elements in the resting position, in accordance with at least one embodiment.

Referring now to FIG. 1C, the air ventilation system 8 is illustrated in the third state, including the manual shutter 21 in the closed position and the plurality of floatable elements 15 in the resting position. When the manual shutter 21 is in the closed position, water and air may be prevented from circulating between the external environment 82 and the interior space 81.

Figure 1D:
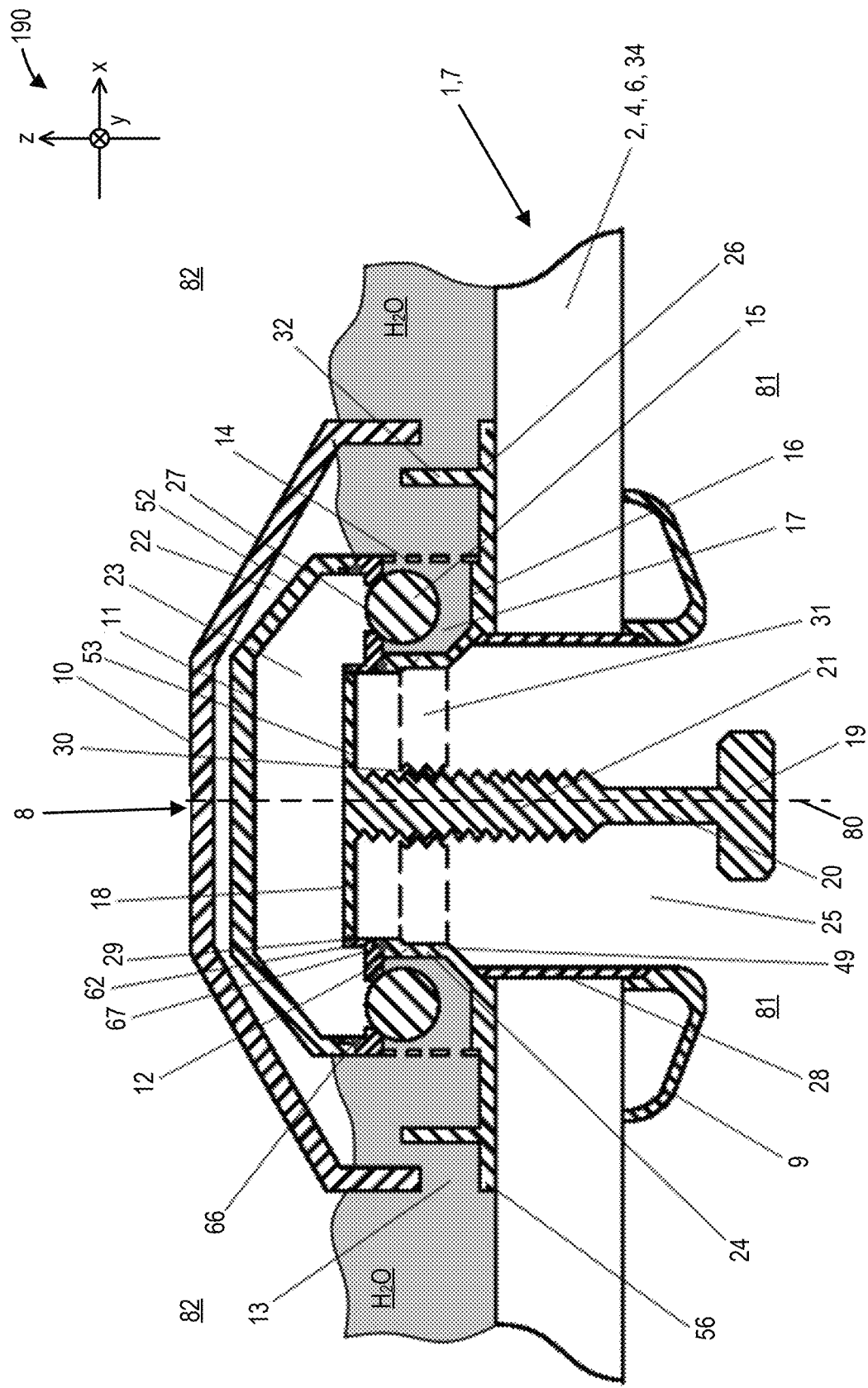
FIG. 1D shows a simplified cross-sectional view of the air ventilation system of FIG. 1A in a fourth state, the fourth state including the manual shutter in the closed position and the floatable elements blocking respective interior valve windows under the influence of water, in accordance with at least one embodiment.

Referring now to FIG. 1D, the air ventilation system 8 is illustrated in the fourth state, including the manual shutter 21 in the closed position and the plurality of floatable elements 15 respectively blocking the plurality of interior valve windows 27 under the influence of the water. When the manual shutter 21 is in the closed position and the plurality of floatable elements 15 respectively block the plurality of interior valve windows 27, water and air may be prevented from circulating between the external environment 82 and the interior space 81.

Figure 2A:
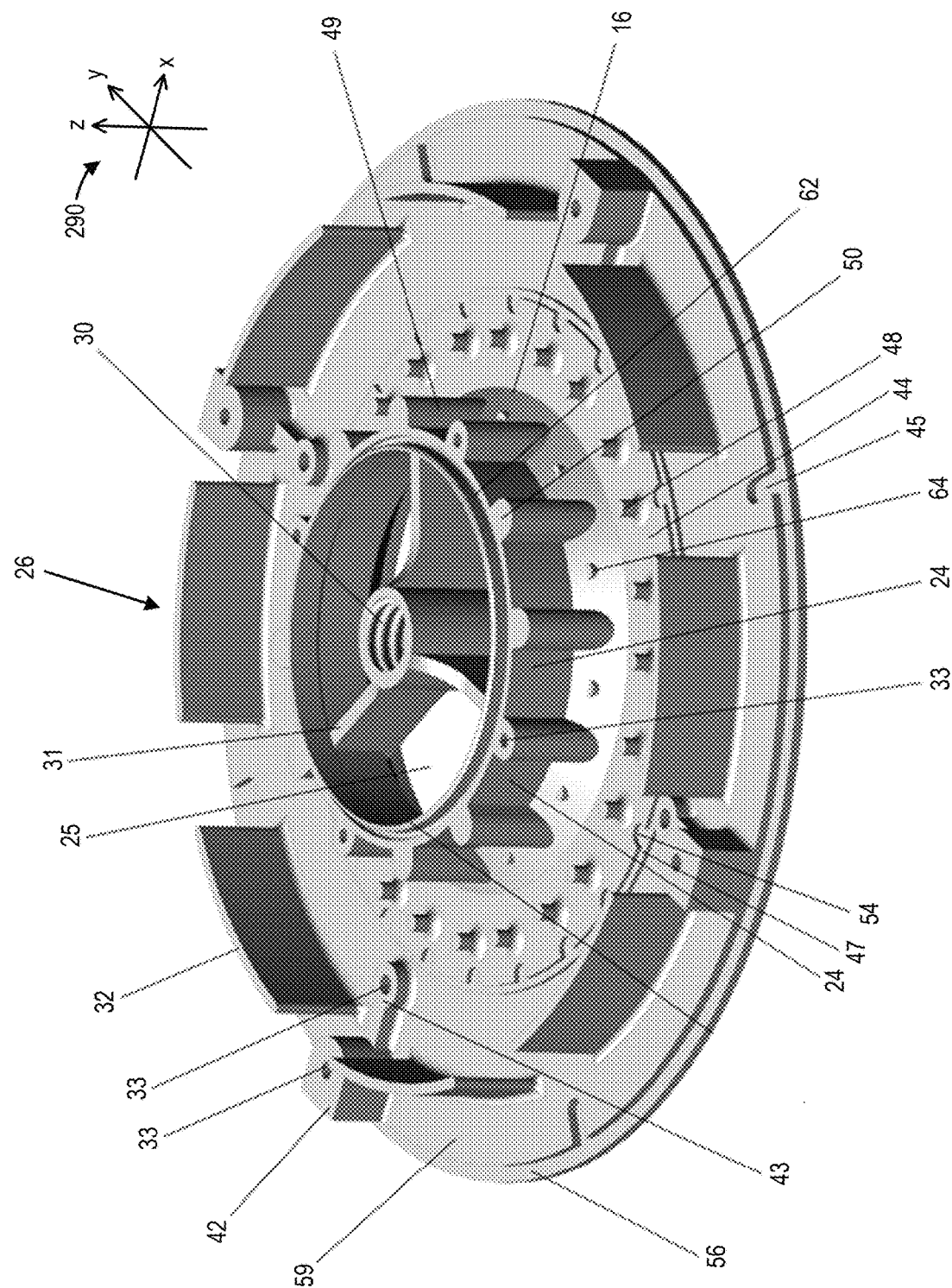
FIG. 2A shows a perspective view of a frame of an air ventilation system, in accordance with at least one embodiment.
Figure 2B:
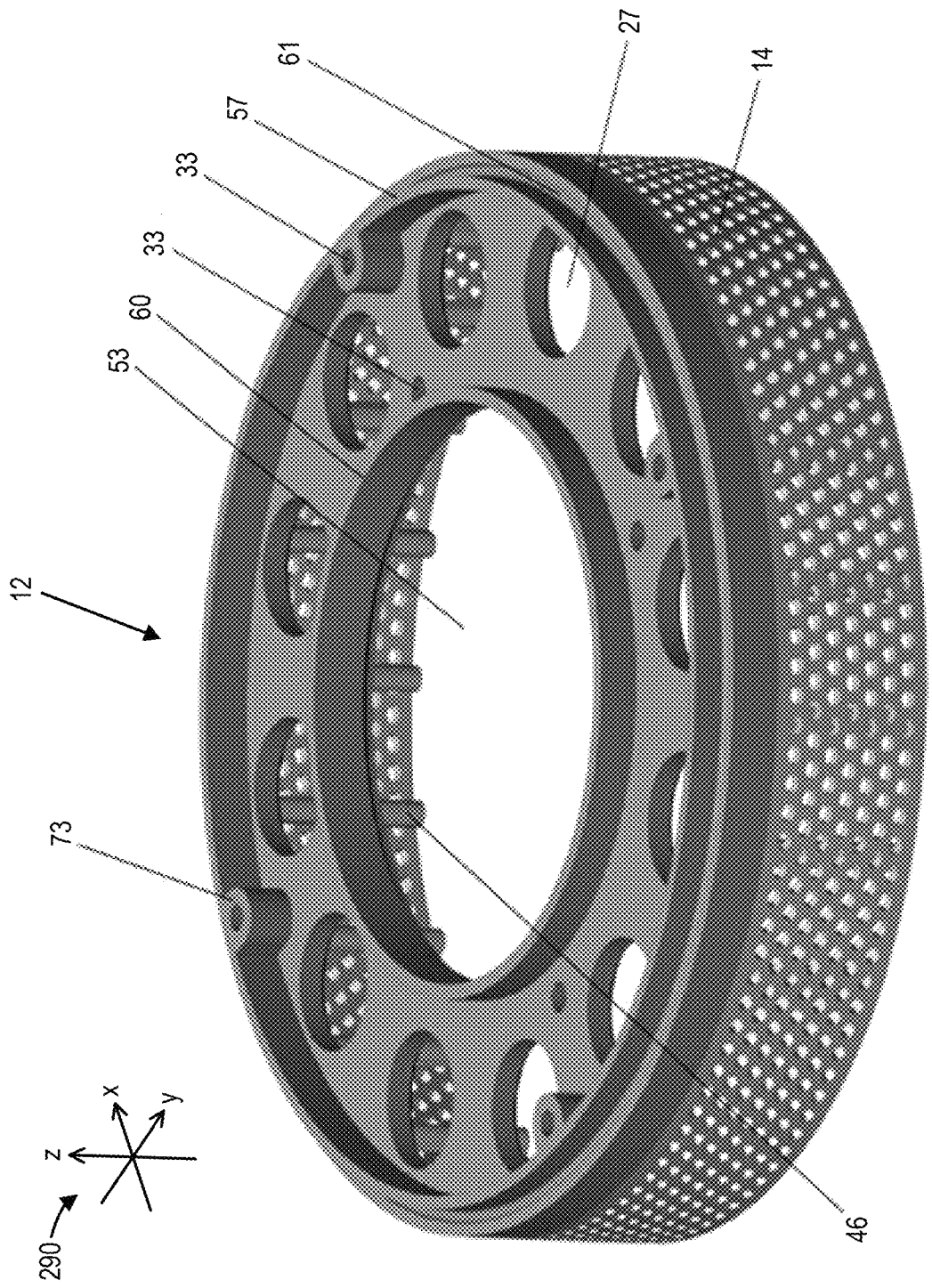
FIG. 2B shows a perspective view of a baffle of an air ventilation system, the baffle including an annular protective screen, in accordance with at least one embodiment.
Figure 4:
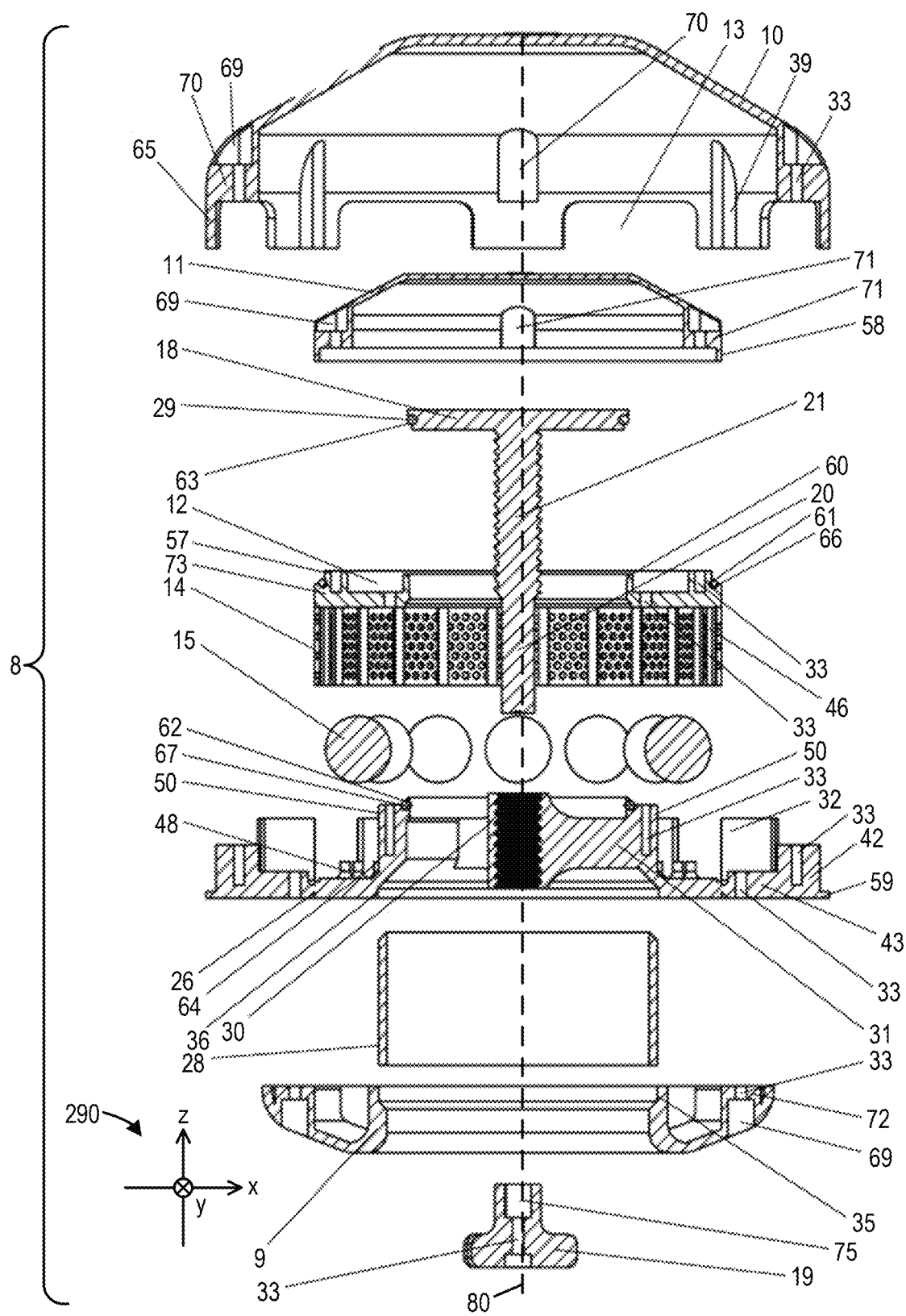
FIG. 4 shows an exploded cross-sectional view of an air ventilation system, in accordance with at least one embodiment.
Figure 6:
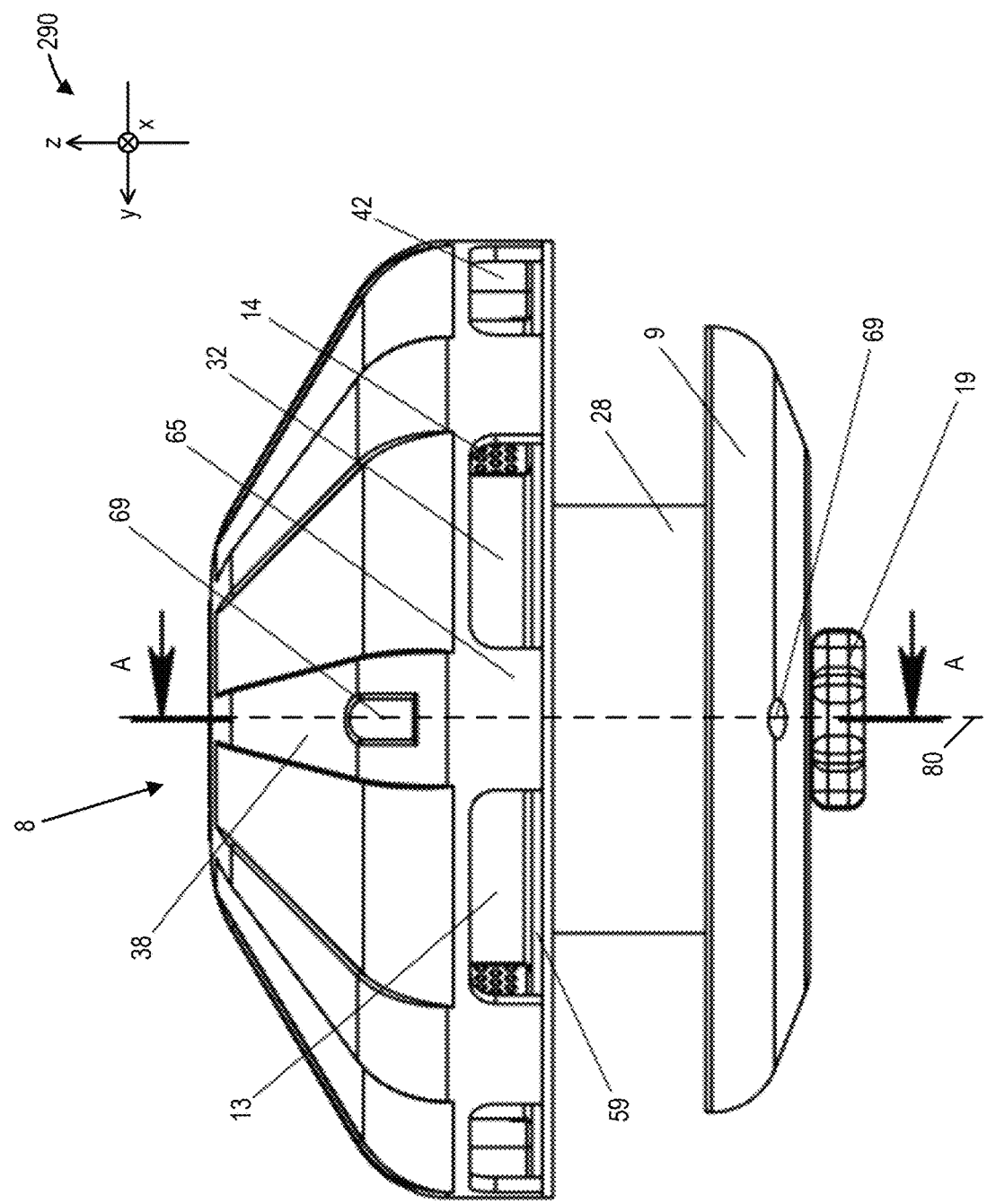
FIG. 6 shows a side view of an air ventilation system, in accordance with at least one embodiment.
Figure 7:
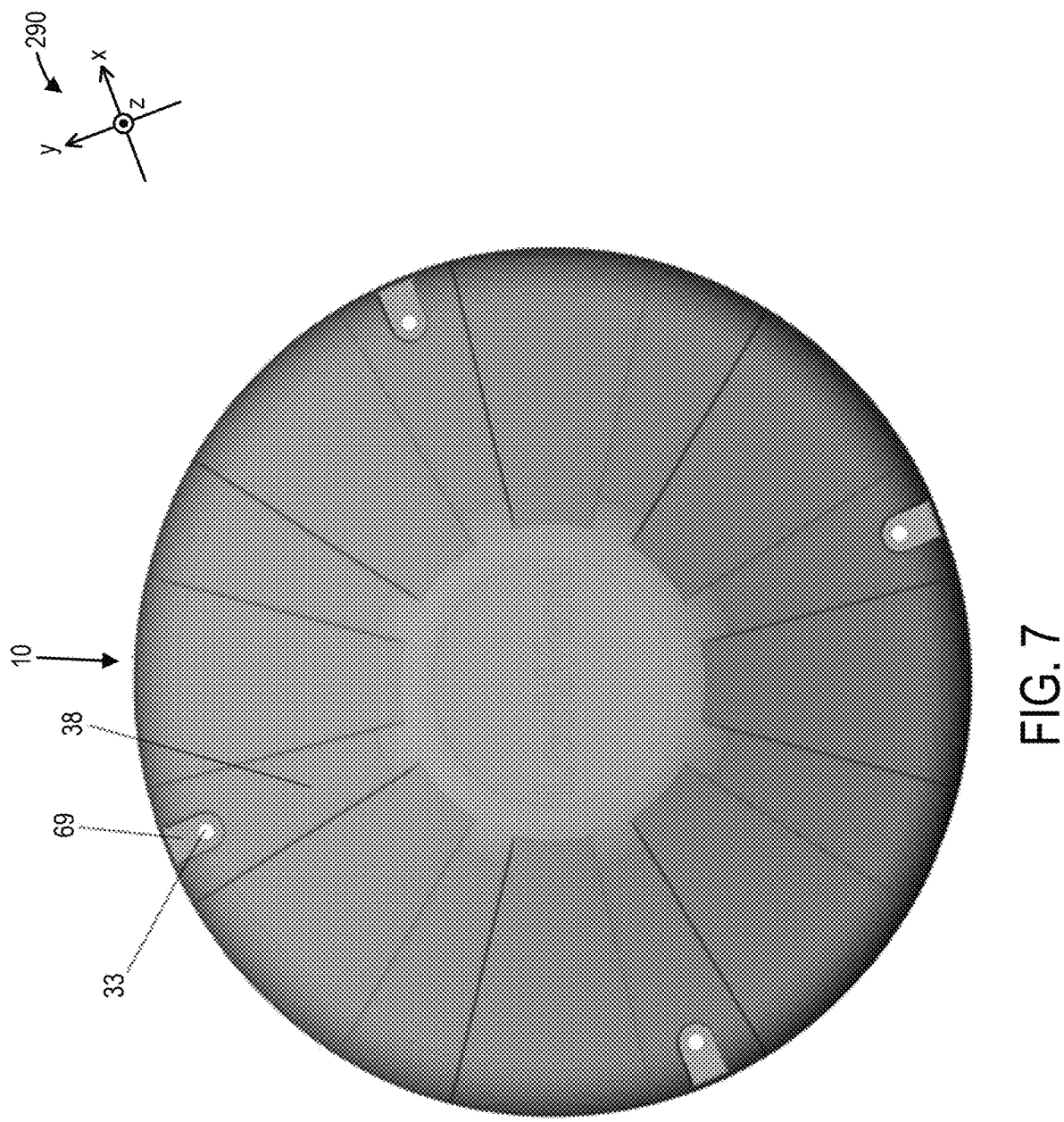
FIG. 7 shows a top view of an air ventilation system, in accordance with at least one embodiment.
Figure 8:
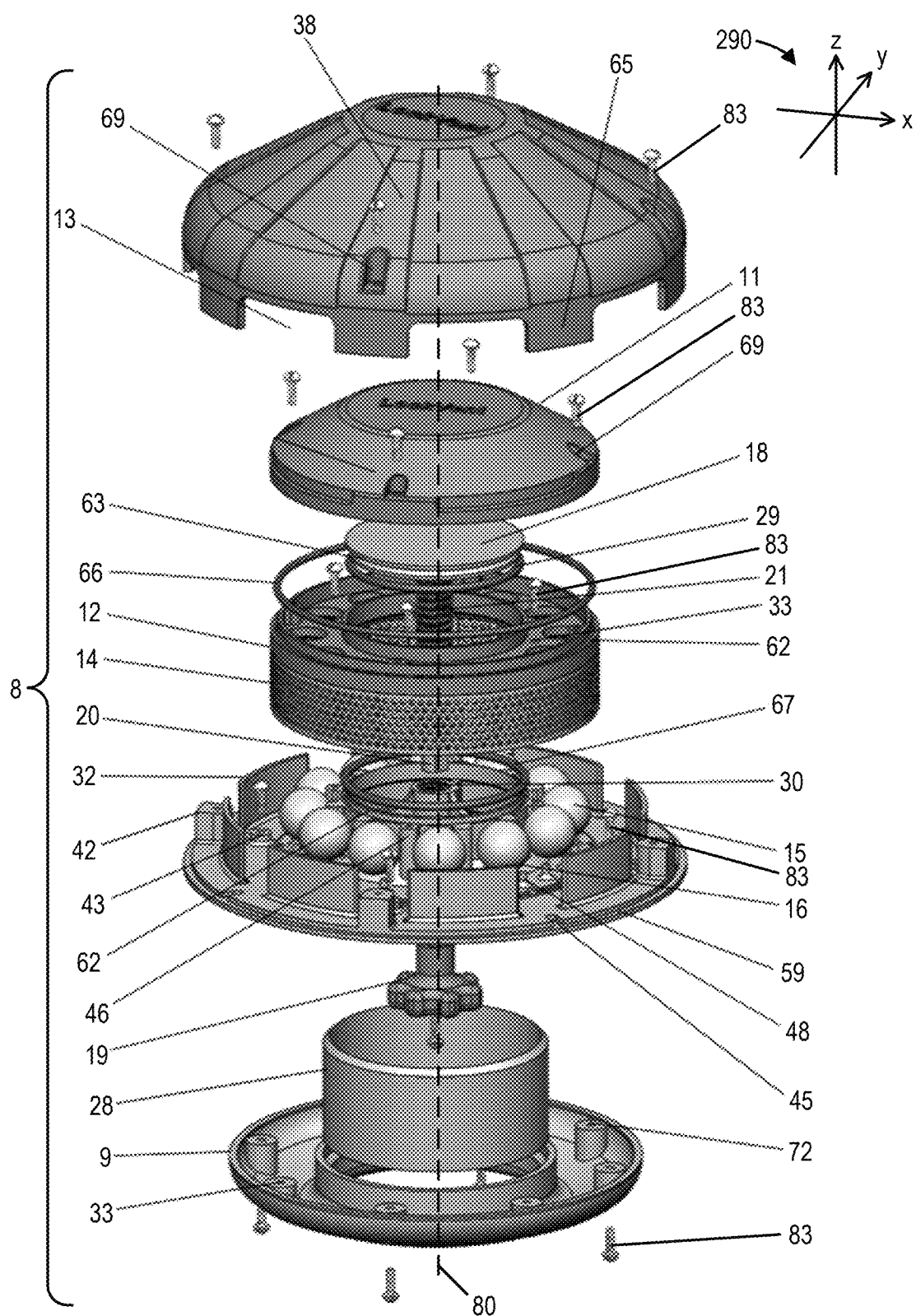
FIG. 8 shows an exploded perspective view of an air ventilation system, in accordance with at least one embodiment.

Referring now to FIGS. 2A-8, various views of the air ventilation system 8 and individual components thereof are depicted. Perspective views depicting the frame 26 and the baffle 12 of the air ventilation system 8 are shown in FIGS. 2A and 2B, respectively. Assembled and exploded cross-sectional views depicting the air ventilation system 8 are shown in FIGS. 3 and 4, respectively. Specifically, the cross-sectional views of FIGS. 3 and 4 are taken along a plane A (see FIGS. 5 and 6) inclusive of the central axis 80. Exploded and assembled side views depicting the air ventilation system 8 are shown in FIGS. 5 and 6, respectively. A top view depicting the air ventilation system 8 is shown in FIG. 7, at least illustrating features of the upper cover 10. An exploded perspective view depicting the air ventilation system 8 is shown in FIG. 8. Hereinbelow, description of FIGS. 2A-8 is concatenated and each of FIGS. 2A-8 may be referred to interchangeably where relevant. For example, reference may be made to one or more specific figures when one or more of FIGS. 2A-8 illustrate a given component or aspect of the air ventilation system 8 with at least some particularity.

A set of Cartesian coordinate axes 290 is shown in FIGS. 2A-8 for contextualizing positions of the various components of the air ventilation system 8 and for comparing between the various views of FIGS. 2A-8. Specifically, x-, y-, and z-axes are provided which are mutually perpendicular to one another. In FIGS. 3 and 4, the x- and z-axes define the plane A and the y-axis is perpendicular thereto. In FIGS. 5-7, the y- and z-axes define the plane A and the x-axis is perpendicular thereto. As shown, the central axis 80 may be parallel with the z-axis.

In an example embodiment, and as shown in FIG. 2A, the frame 26 may be configured with an inner round plate 44 circumscribing the barrel 49 in a plane perpendicular with the central axis 80. The inner round plate 44 may include an outer annular shelf or terrace 47 on which a plurality of half-round slots 54 set in the inner round plate 44 may be superimposed. The plurality of half-round slots 54 may be clearance fit to a plurality of inner half-round ribs 46 included in the annular protective screen 14 (see FIG. 2B).

In an example embodiment, the frame 26 may include a plurality of upper barrel ribs 50 extending from the inner round plate 44 and directly coupled to an inner wall 24 of the valve chamber 17. Specifically, the plurality of upper barrel ribs 50 may be evenly spaced around a circumference of the barrel 49 with respect to rotation about the central axis 80. Each adjacent pair of the plurality of floatable elements 15 may be interposed by one of the plurality of upper barrel ribs 50 so as to maintain each of the plurality of floatable elements 15 separate from one another (e.g., such that a space may be provided between each adjacent pair of the plurality of floatable elements 15).

In an example embodiment, the frame 26 may include a plurality of outer stakes 48 and a plurality of inner stakes 64, each of the plurality of outer stakes 48 and the plurality of inner stakes 64 extending from the inner round plate 44. Specifically, the plurality of outer stakes 48 may be evenly spaced around a first circle circumscribing and concentric with the circumference of the barrel 49 with respect to rotation about the central axis 80, and the plurality of inner stakes 64 may be evenly spaced around a second circle circumscribing and concentric with the circumference of the barrel 49 with respect to rotation about the central axis 80. In some embodiments, and as shown in FIG. 2A, each of the plurality of outer stakes 48 and each of the plurality of inner stakes 64 may be circular in shape.

In an example embodiment, when the plurality of floatable elements 15 is in the resting position, each of the plurality of floatable elements 15 may rest on a respective one of the plurality of seats 16 formed as two adjacent outer stakes 48 and an inner stake 64 positioned between the two adjacent outer stakes 48 with respect to rotation about the central axis 80. Accordingly, each of the plurality of seats 16 may be formed as three stakes 48, 64 which may prevent a respective one of the plurality of floatable elements 15 from moving away from a corresponding one of the plurality of interior valve windows 27.

In an example embodiment, a gasket 67 may be positioned at least partially within a gasket slot 62 of the frame 26. The gasket 67 may be sandwiched between the baffle 12 and the frame 26 so as to provide a seal therebetween, e.g., to prevent water from entering the interior duct 25 from the valve chamber 17 (see FIGS. 3 and 4).

In an example embodiment, a gasket 66 may be positioned at least partially within a gasket slot 61 of the baffle 12. The gasket 66 may be sandwiched between the lid 11 and the baffle 12 so as to provide a seal therebetween, e.g., to prevent water from entering the underlid chamber 23 from the upper chamber 22 (see FIGS. 3 and 4).

In an example embodiment, one or more of the gaskets 29, 66, and 67 may be welded into one or more of the gasket slots 63, 61, and 62, respectively. In such an embodiment, the one or more of the gaskets 29, 66, and 67 may be prevented from freely rotating or otherwise shifting within the one or more of the gasket slots 63, 61, and 62 (e.g., thereby facilitating manufacturing of the air ventilation system 8).

In an example embodiment, the lid 11 may include an inner annular slot 58 to prevent movement of the lid 11 perpendicular to the central axis 80. Specifically, the inner annular slot 58 may receive a top annular outer ring 57 of the baffle 12, the top annular outer ring 57 sized so as to be clearance fit within the inner annular slot 58.

In an example embodiment, each of the upper cover 10, the lid 11, and the deflector 9 may include a plurality of fastening grooves 69. Specifically, the plurality of fastening grooves 69 of the upper cover 10 may be respectively aligned with a plurality of inner fastening stubs 70 of the upper cover 10 evenly spaced about a circumference of the upper cover 10 with respect to rotation about the central axis 80, the plurality of fastening grooves 69 of the lid 11 may be respectively aligned with a plurality of inner fastening stubs 71 of the lid 11 evenly spaced about a circumference of the lid 11 with respect to rotation about the central axis 80, and the plurality of fastening grooves 69 of the deflector 9 may be respectively aligned with a plurality of inner fastening stubs 72 of the deflector 9 evenly spaced about a circumference of the deflector 9 with respect to rotation about the central axis 80.

In an example embodiment, the frame 26 may include a plurality of side fastening stubs 42 respectively aligned with the plurality of inner fastening stubs 70. Accordingly, the plurality of side fastening stubs 42 may be evenly spaced about, or substantially about, the circumference of the frame 26 with respect to rotation about the central axis 80. Each of the plurality of side fastening stubs 42 and each of the plurality of inner fastening stubs 70 may include one of a plurality of fastener holes 33 such that each aligned side fastening stub 42 and inner fastening stub 70 may receive a single fastener 83 (see, e.g., FIG. 3 for aligned fastening stubs 42, 70; FIG. 8 for fasteners 83) to removably fasten the upper cover 10 to the frame 26.

In an example embodiment, the baffle 12 may include a plurality of top fastening stubs 73 respectively aligned with the plurality of inner fastening stubs 71. Accordingly, the plurality of top fastening stubs 73 may be evenly spaced about, or substantially about, a circumference of the baffle 12 with respect to rotation about the central axis 80. Each of the plurality of top fastening stubs 73 and each of the plurality of inner fastening stubs 71 may include one of the plurality of fastener holes 33 such that each aligned top fastening stub 73 and inner fastening stub 71 may receive a single fastener 83 (see, e.g., FIG. 3 for aligned fastening stubs 71, 73; FIG. 8 for fasteners 83) to removably fasten the baffle 12 to the lid 11.

In an example embodiment, the frame 26 may include a plurality of inner fastening stubs 43 respectively aligned with the plurality of inner fastening stubs 72. Accordingly, the plurality of inner fastening stubs 43 may be evenly spaced about, or substantially about, the circumference of the frame 26 with respect to rotation about the central axis 80. Each of the plurality of inner fastening stubs 43 and each of the plurality of inner fastening stubs 72 may include one of the plurality of fastener holes 33 such that each aligned inner fastening stub 43 and inner fastening stub 72 may receive a single fastener 83 (see, e.g., FIG. 3 for aligned fastening stubs 43, 72; FIG. 8 for fasteners 83) to removably fasten the frame 26 to the deflector 9. The plurality of inner fastening stubs 43 may be positioned closer to the central axis 80 than the plurality of side fastening stubs 42. Orthographic projections of one of the plurality of inner fastening stubs 43 and one of the side fastening stubs 42 may be at least partially obscured by an orthographic projection of one of the reinforced top strips 38 onto the plane perpendicular with the central axis 80.

In an example embodiment, the plurality of floatable elements 15 may be positioned within the valve chamber 17 (e.g., adjacent to the inner wall 24) and at least partially enclosed by the baffle 12. In certain embodiments, the plurality of floatable elements 15 may not be affixed, adhered, or otherwise physically coupled to one another or any other component of the air ventilation system 8 so as to freely move between the plurality of seats 16 and the plurality of interior valve windows 27 (however, and as described in detail above, movement of each given floatable element 15 may be restricted so that the given floatable element 15 may only rest on a corresponding one of the plurality of seats 16 in the resting position and may only block a corresponding one of the interior valve windows 27 under the influence of water).

In an example embodiment, the plurality of floatable elements 15 may be configured as a plurality of lightweight floatable balls 15 and each of the plurality of interior valve windows 27 may be circular in shape, with a diameter of each of the plurality of interior valve windows 27 being less than a diameter of each of the plurality of lightweight floatable balls 15. Accordingly, the plurality of lightweight floatable balls 15 may respectively seal the plurality of (circular) interior valve windows 27 under the influence of water.

In an example embodiment, at least some of the plurality of upper barrel ribs 50 may include respective fastener holes 33. The at least some of the plurality of upper barrel ribs 50 including the fastener holes 33 may be respectively aligned with fastener holes 33 disposed in the baffle 12, such that each aligned upper barrel rib 50 and fastener hole 33 in the baffle 12 may receive a single fastener 83 (see, e.g., FIG. 3 for aligned rib 50 and hole 33; FIG. 8 for fasteners 83) to removably fasten the frame 26 to the baffle 12.

In an example embodiment, the valve subsystem 52 may include the manual shutter 21, the plurality of floatable elements 15, the baffle 12, and the lid 11. The upper cover 10 may be provided to protect the valve subsystem 52 and may take on various configurations. Accordingly, in some embodiments, various configurations of the upper cover 10 may be interchangeably coupled to the valve subsystem 52 based on a particular use case, the object 1, 7 (e.g., whether the object 1, 7 is a particular type of facility or vehicle), etc. In certain embodiments, the upper cover 10 may function as a separate guarding system (such as a dorade box and the like) to prevent liquid entry from the external environment 82 into the air ventilation system 8 (and thereby prevent liquid entry into the interior space 81). In additional or alternative embodiments, the upper cover 10 may be selected to minimize a profile thereof, e.g., extending from the cover 2, 4, 6, 34.

In an example embodiment, each of the frame 26 and the deflector 9 may be couplable to the ancillary air pipe 28. Specifically, the frame 26 may include an inner annular ancillary air pipe lip 36 extending into a bottom face of the frame 26 (e.g., opposite to the deflector 9) and the deflector 9 may include an inner annular ancillary air pipe lip 35 extending into a top face of the deflector 9 (e.g., opposite to the frame 26). Each of the inner annular ancillary air pipe lips 35 and 36 may be sized so as to be clearance fit to the ancillary air pipe 28. Accordingly, an inner diameter of each of the inner annular ancillary air pipe lips 35 and 36 may be substantially equal to an outer diameter of the ancillary air pipe 28. In embodiments wherein the ancillary air pipe 28 is present, a length of the ancillary air pipe 28 may be substantially equal to the thickness of the cover 2, 4, 6, 34.

In an example embodiment, the manual shutter 21 may be inserted into an orifice 37 (see FIG. 3) extending through the deflector 9 along the central axis 80. Specifically, components of the manual shutter 21, such as the cap 18, the knob 19, and the handle 20, may intersect with, and be rotationally symmetric with respect to, the central axis 80. Additionally, orthographic projections of such components of the manual shutter 21 may at least partially overlap with an orthographic projection of the orifice 37 in the plane perpendicular to the central axis 80.

In an example embodiment, the air ventilation system 8 may extend along the central axis 80 from an uppermost extent (e.g., above the cover 2, 4, 6, 34 when the air ventilation system 8 is installed on the object 1, 7) at a top surface of the upper cover 10 to a lowermost extent (e.g., below the cover 2, 4, 6, 34 when the air ventilation system 8 is installed on the object 1, 7) at a bottom surface of the knob 19. Accordingly, when the air ventilation system 8 is installed on the object 1, 7, at least a portion of the air ventilation system 8, such as at least a portion of the manual shutter 21 (e.g., the knob 19 and at least a portion of the handle 20) and at least a portion of the deflector 9, may enter the interior space 81, while a remaining portion of the air ventilation system 8, excepting component(s) of the air ventilation system 8 extending through the cover 2, 4, 6, 34, may extend into the external environment 82.

In an example embodiment, the frame 26 may include an annular bottom slot 51. The annular bottom slot 51 may permit additional sealing as desired. For example, an adhesive sealant (e.g., selected to maintain sealing upon exposure to salt water) may be supplied within and throughout the annular bottom slot 51, and the air ventilation system 8 may be installed on the cover 2, 4, 6, 34 such that a bottom surface of the frame 26 is in face-sharing contact with a top surface of the cover 2, 4, 6, 34, the adhesive sealant thereby being placed in direct contact with the top surface of the cover 2, 4, 6, 34. In alternative embodiments wherein the cover 2, 4, 6, 34 is a clean and flat surface or a substantially clean and substantially flat surface, a gasket (not shown at FIGS. 2A-8) may be welded into the annular bottom slot 51 and no adhesive sealant may be supplied within the annular bottom slot 51; such configurations may facilitate manufacturing of the air ventilation system 8, e.g., by reducing costs and complexity. As an example, the gasket may be formed from a silicone or a silicone composite material, e.g., the same material from which the gaskets 29, 66, and 67 are formed.

In an example embodiment, the annular bottom slot 51 may be formed by installing the valve subsystem 52 on the frame 26. In such embodiments, the valve subsystem 52 may be removed from the air ventilation system 8, e.g., along the annular bottom slot 51, and installed in another ventilation or guarding system (e.g., in a dorade box with a cowl).

In an example embodiment, the upper cover 10 may include a plurality of reinforced top strips 38 respectively aligned with a plurality of skirts 65 extending to the frame 26 parallel to the central axis 80, where adjacent pairs of the plurality of exterior air windows 13 may be respectively interposed by the plurality of skirts 65. Accordingly, the plurality of skirts 65 may be evenly spaced about, or substantially about, the circumference of the upper cover 10 with respect to rotation about the central axis 80.

In an example embodiment, the upper cover 10 may include a plurality of inner side ribs 39 (see FIG. 4). Specifically, the plurality of inner side ribs 39 may be evenly spaced about, or substantially about, the circumference of the upper cover 10 with respect to rotation about the central axis 80. As an example, each of the plurality of inner side ribs 39 may be semicircular in shape.

In an example embodiment, the frame 26 may include an annular outer shelf or terrace 59. A plurality of half-round slots 45 may be set in the annular outer shelf or terrace 59 so as to be superimposed on the annular ledge 56, the plurality of half-round slots 45 respectively aligned with the plurality of inner side ribs 39. Accordingly, the plurality of half-round slots 45 may be evenly spaced about, or substantially about, the circumference of the frame 26 with respect to rotation about the central axis 80. The plurality of half-round slots 45 may be sized so as to receive the plurality of inner side ribs 39, respectively (e.g., the plurality of inner side ribs 39 may be respectively clearance fit to the plurality of half-round slots 45).

In an example embodiment, each component of the air ventilation system 8 (e.g., all components or all components not formed from a metal, such as the fasteners 83) may be formed from a synthetic or semi-synthetic plastic and/or a synthetic or semi-synthetic plastic composite. Specifically, the plastic and/or the plastic composite may be selected to withstand prolonged exposure (e.g., over a lifetime use of the air ventilation system 8) to aggressive, corrosive, or otherwise extreme conditions, such as natural salt water, extreme ambient temperatures (e.g., between −50° C. and 50° C.), relatively high ambient humidity (e.g., greater than 70% relative humidity), relatively high wind speeds (e.g., greater than 40 mph), and storm conditions. Accordingly, in some embodiments, no electrical components (e.g., reliant upon metal components) may be included in the air ventilation system 8. In additional or alternative embodiments, more complex subassemblies (e.g., utilizing a greater amount of time and skill to manufacture than the valve subsystem 52) may not be included in the air ventilation system 8. As such, the air ventilation system 8 may be assembled from relatively simple plastic materials selected to operate with less resistance and/or greater reliability. In other embodiments, one or more electrical (e.g., solar-powered) ventilators (not shown at FIGS. 2A-8) may be included in the air ventilation system 8 to promote further air circulation.

In an example embodiment, each of the gaskets 29, 66, and 67 may be formed from a silicone or a silicone composite. In an alternative embodiment, at least some components of the air ventilation system 8, such as the baffle 12 and the cap 18, may be at least partially formed from a silicone or a silicone composite. In such an alternative embodiment, one or more of the gaskets 29, 66, and 67 may not be included in the air ventilation system 8, as at least some sealing functionality may be provided by other silicone/silicone composite-based components of the air ventilation system 8.

Figure 10:
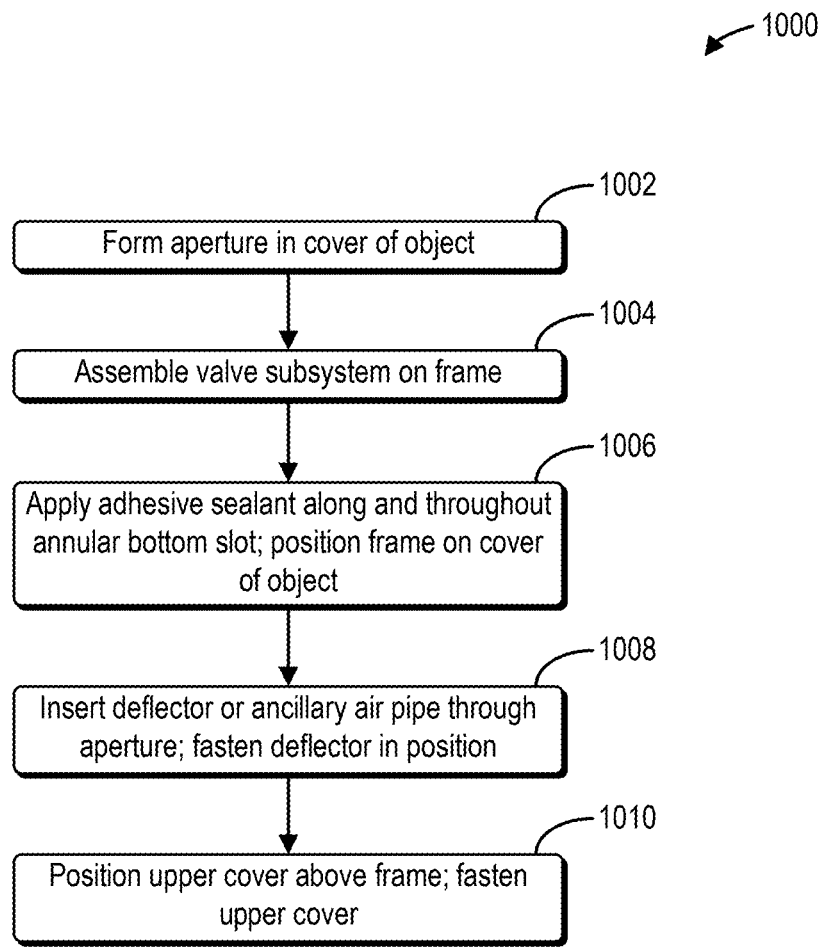
FIG. 10 shows a block diagram of a method for installing an air ventilation system, in accordance with at least one embodiment.

Referring now to FIG. 10, a block diagram of a method 1000 for installing an air ventilation system, such as the air ventilation system 8 described in detail above with reference to FIGS. 1A-8, is shown. As such, components described hereinbelow with reference to the method 1000 are numbered in accordance with the embodiments of FIGS. 1A-8. Embodiments of methods for installing air ventilation systems are not limited to the below description of the method 1000. For instance, in certain embodiments, individual steps discussed with reference to the method 1000 may be added, removed, substituted, modified, or interchanged.

At block 1002, the method 1000 of installing the air ventilation system 8, e.g., in the cover 2, 4, 6, 34, may include cutting or otherwise forming an aperture, e.g., a circular aperture, in the cover 2, 4, 6, 34. Specifically, a diameter of the circular aperture may be substantially equal or slightly greater than an inner diameter of the deflector 9 or the outer diameter of the ancillary air pipe 28 such that the deflector 9 or the ancillary air pipe 28 may be clearance fit to the circular aperture. When included, the ancillary air pipe 28 may be cut to a length substantially equal to the thickness of the cover 2, 4, 6, 34.

At block 1004, the method 1000 may further include assembling the valve subsystem 52 by positioning on the frame 26, in sequence, the plurality of floatable elements 15, the gasket 67, the annular protective screen 14, the baffle 12, the gasket 29, the manual shutter 21, the gasket 66, and the lid 11.

At block 1006, the method 1000 may further include applying an adhesive sealant along and throughout the annular bottom slot 51, and positioning the frame 26 on the cover 2, 4, 6, 34.

At block 1008, the method 1000 may further include inserting the deflector 9 or the ancillary air pipe 28 through the circular aperture, and removably fastening the deflector 9 in position. When the ancillary air pipe 28 is included, for example, the cover 2, 4, 6, 34 may extend between the inner annular ancillary air pipe lips 35 and 36. In such examples, the ancillary air pipe 28 may be secured in position by removably fastening the frame 26 to the deflector 9 (e.g., via fasteners 83, with each fastener 83 received by a respective aligned pair of inner fastening stubs 43 and 72). In examples where the thickness of the cover 2, 4, 6, 34 precludes direct fastening of the frame 26 to the deflector 9 (e.g., the cover 2, 4, 6, 34 may be a wood deck), fasteners 83 provided to inner fastening stubs 43 and 72 may removably fasten the frame 26 and the deflector 9, respectively, to the cover 2, 4, 6, 34 itself. Alternatively, if the ancillary air pipe 28 is not included (e.g., when the cover 2, 4, 6, 34 is sufficiently thin and/or soft to removably fasten the deflector 9 to the frame 26 without substantial leakage), portions of the deflector 9 and the frame 26 in direct contact with the circular aperture (e.g., at the inner annular ancillary air pipe lips 35 and 36) may be reinforced with greater (e.g., double) thickness. As such, greater sealing may be provided at the air ventilation system, which may extend a lifetime use of the cover 2, 4, 6, 34 (e.g., by preventing moisture from directly entering the circular aperture from the external environment 82). Whether or not the ancillary air pipe 28 is included, in certain examples, fasteners 83 provided to aligned pairs of inner fastening stubs 43 and 72 may be inserted so as to enter through either the frame 26 or the deflector 9, or through both (e.g., half of the fasteners 83 may be inserted so as to enter through the frame 26 and a remaining half of the fasteners 83 may be inserted so as to enter through the deflector 9).

At block 1010, the method 1000 may further include positioning the upper cover 10 above the frame 26 and the valve subsystem 52 (e.g., opposite to the deflector 9), and removably fastening the upper cover 10 as positioned. Specifically, the upper cover 10 may be positioned in direct contact with the frame 26 (e.g., such that the plurality of skirts 65 are in direct contact with the annular outer shelf or terrace 59 and the plurality of inner side ribs 39 are respectively clearance fit to the plurality of half-round slots 45) and removably fastened to the frame 26 (e.g., via fasteners 83, with each fastener 83 received by a respective aligned pair of side fastening stub 42 and inner fastening stub 70).

When the air ventilation system 8 is fully installed, such as via the process described hereinabove, liquid (e.g., from periodic exposure to seawater and/or freshwater and/or precipitation such as rain, sleet, and/or snow, where periodic exposure may occur at least once per year on average or more frequently depending on weather and/or a current location of the cover 2, 4, 6, 34) may be prevented or substantially prevented from passing into the cover 2, 4, 6, 34 via the circular aperture while still allowing air circulation therethrough.

Figure 11:
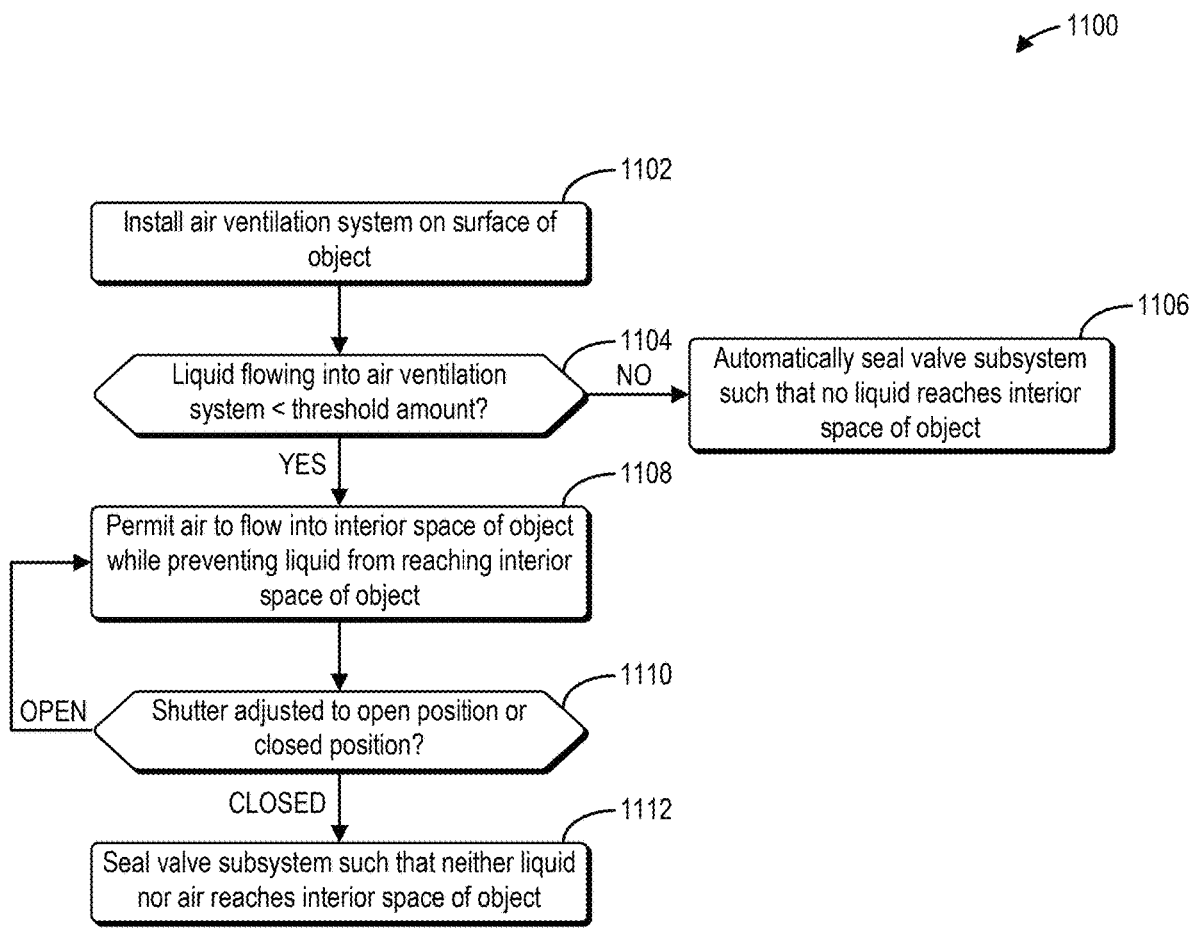
FIG. 11 shows a block diagram of a method for controlling air and liquid flows between an external environment and an interior space of an object, in accordance with at least one embodiment.

Referring now to FIG. 11, a block diagram of a method 1100 for controlling air and liquid flows between an external environment and an interior space of an object, e.g., via an air ventilation system such as the air ventilation system 8 described in detail above with reference to FIGS. 1A-8, is shown. As such, components described hereinbelow with reference to the method 1100 are numbered in accordance with the embodiments of FIGS. 1A-8. Embodiments of methods for controlling air and liquid flows between external environments and interior spaces of objects are not limited to the below description of the method 1100. For instance, in certain embodiments, individual steps discussed with reference to the method 1100 may be added, removed, substituted, modified, or interchanged.

At block 1102, the method 1100 may include installing the air ventilation system 8 in the cover (or other surface) 2, 4, 6, 34 of the object 1, 7 (e.g., a facility or a watercraft or other vehicle). An exemplary method of installing the air ventilation system 8 is described in detail above with reference to FIG. 10. As described herein, the air ventilation system 8 may be configured to permit fluidic communication between the external environment 82 and the interior space 81 of the object 1, 7.

At block 1104, the method 1100 may include determining if a liquid flowing into the air ventilation system 8 is less than a threshold amount. In an example embodiment, the threshold amount may be a sufficient amount of liquid to spill up and into the underlid chamber 23 via the plurality of interior valve windows 27, e.g., were the plurality of floatable elements 15 not present.

If the liquid flowing into the air ventilation system 8 is greater than or equal to the threshold amount, the method 1100 may proceed to block 1106, where the method 1100 may include automatically sealing the valve subsystem 52 such that none of the liquid may reach the interior space 81. For example, the valve subsystem 52 may include at least two chambers (e.g., the chambers 17, 23), wherein one of the at least two chambers (e.g., the valve chamber 17) may be in fluidic communication with the external environment 82, and wherein one of the at least two chambers (e.g., the underlid chamber 23) may be in fluidic communication with the interior space 81. As such, automatically sealing the valve subsystem 52 may include severing fluidic communication between the one of the at least two chambers in fluidic communication with the external environment 82 and the one of the at least two chambers in fluidic communication with the interior space 81.

If the liquid flowing into the air ventilation system 8 is less than the threshold amount, the method 1100 may proceed to block 1108, where the method 1100 may include permitting the air to flow into the interior space 81 while preventing the liquid from reaching the interior space 81. For example, when less than the threshold amount of the liquid is present, a level of the liquid may not be high enough to overcome the inner wall 24 and enter into the interior duct 25 and thereby the interior space 81 (e.g., even without the plurality of floatable elements 15 automatically sealing the plurality of interior valve windows 27).

At block 1110, the method 1100 may include determining whether the manual shutter 21 is in the open position or the closed position. If the manual shutter is in the open position, the method 1100 may return to block 1108 to continue permitting the air to flow into the interior space 81 while preventing the liquid from reaching the interior space 81. If the manual shutter is in the closed position, the method 1100 may proceed to block 1112, where the method 1100 may include sealing the valve subsystem 52 (e.g., by closing the manual shutter 21) such that neither the liquid nor the air reaches the interior space 81.

Referring now to FIGS. 9A-9G, various objects 1, 7 [e.g., watercraft or other floating facility, such as a boat, a kayak, or a yacht; a road vehicle, such as a recreational vehicle (RV) or passenger car; a dry storage box; etc.] and covers 2, 4, 6, 34 (e.g., a deck, a deck head, a hatch, a storage cover, etc.) thereon or thereof are depicted, each including the air ventilation system 8. Specifically, and as described in detail above with reference to FIGS. 1A-8, the air ventilation system 8 may be operable to permit restricted fluidic communication between the external environment 82 and at least one interior space (e.g., the interior space 81; not shown at FIGS. 9A-9G) of a respective one of the various objects 1, 7 and covers 2, 4, 6, 34. For example, the air ventilation system 8 may include at least two chambers (e.g., the chambers 17, 23; not shown at FIGS. 9A-9G), wherein one of the at least two chambers (e.g., the valve chamber 17) may be in continuous (e.g., uninterrupted) fluidic communication with the external environment 82, and wherein one of the at least two chambers (e.g., the underlid chamber 23) may be in fluidic communication with the at least one interior space. However, during certain modes of operation of the air ventilation system 8, fluidic communication between the at least two chambers, and thereby between the external environment 82 and the at least one interior space, and/or between the at least two chambers and the at least one interior space may be restricted or altogether prevented.

Figure 9A:
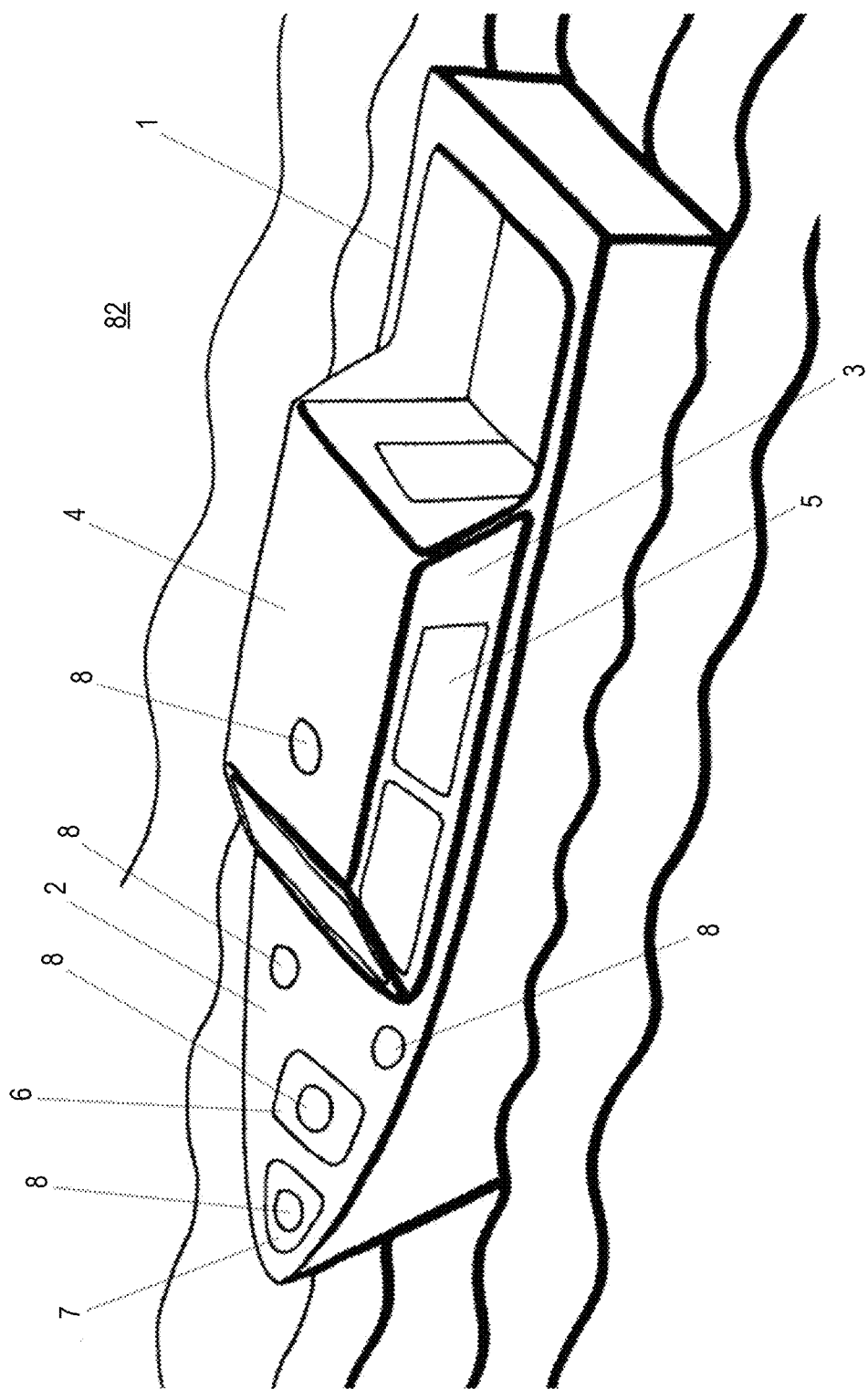
FIGS. 9A-9G show various objects and covers thereon or thereof, each including an air ventilation system operable to permit restricted fluidic communication between an external environment and at least one interior space of a respective one of the various objects and covers, in accordance with at least one embodiment.
Figure 9B:
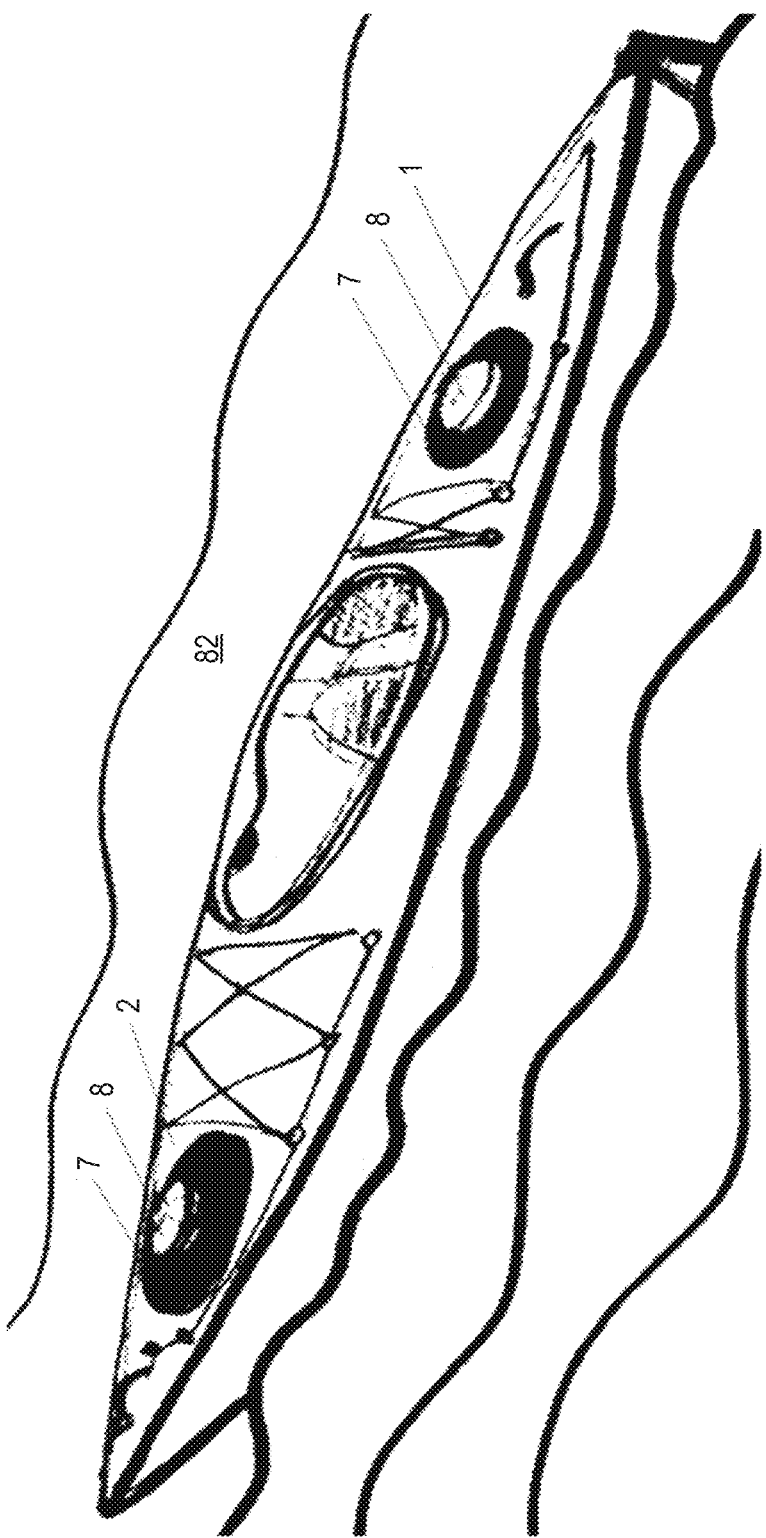
Figure 9C:
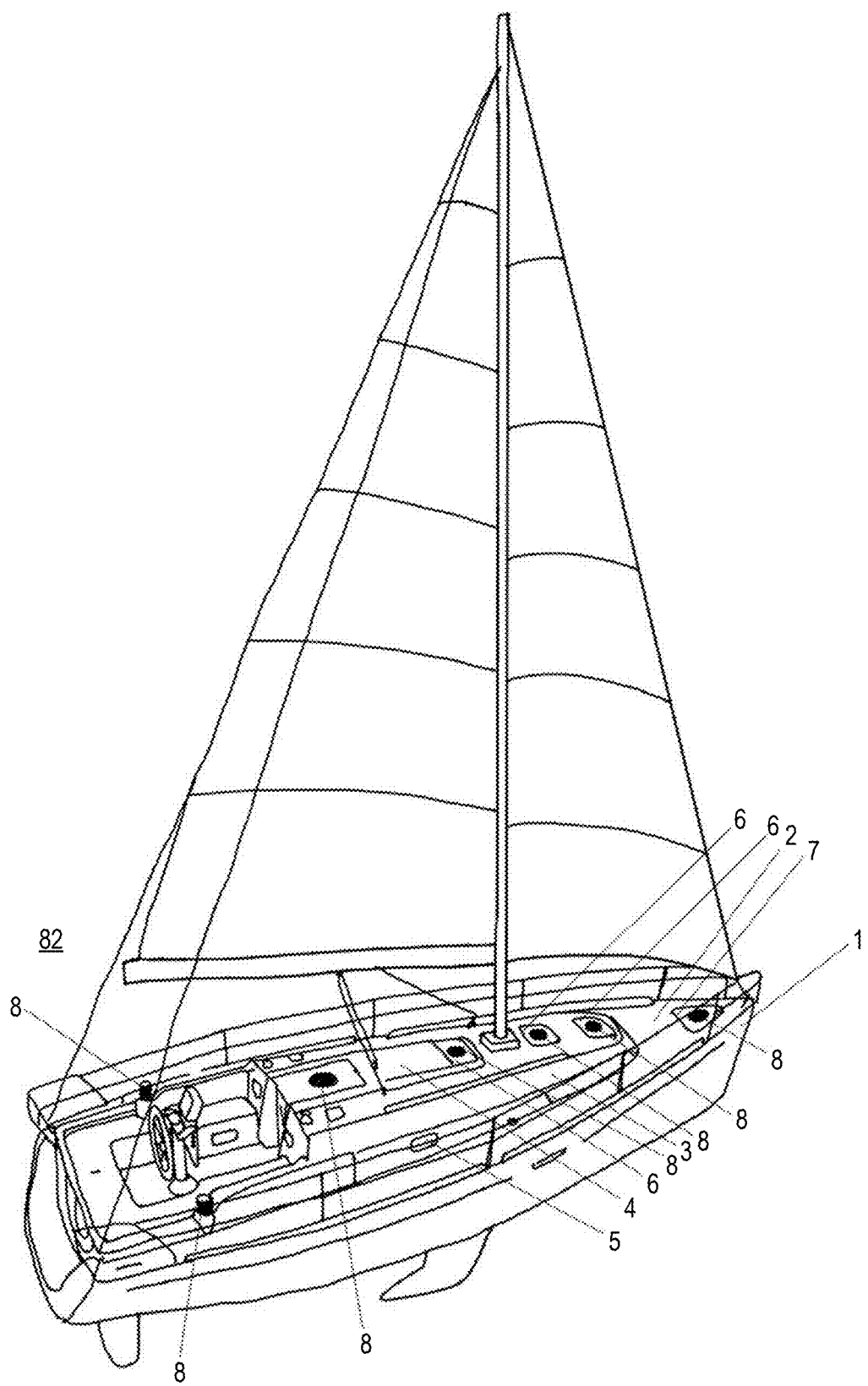

As an example, and as shown at FIGS. 9A and 9C, the object 1 may be a boat 1, such as a motorboat 1 (see FIG. 9A) or a sailing or motorized yacht 1 (see FIG. 9C), including a deck 2, the deck 2 including one or more hatches 6, one or more dry storage boxes 7, and a saloon compartment 3 with a deck head 4 provided with one or more windows 5. In the depicted embodiment, one or more air ventilation systems 8 may be positioned at each of the deck 2, the one or more dry storage boxes 7, the one or more hatches 6, a forward end of the deck head 4, and above other interior compartments (e.g., where sufficient natural ventilation may not persist).

As another example, and as shown at FIG. 9B, the object 1 may be a small watercraft 1, such as a kayak 1, including the deck 2 provided with the one or more dry storage boxes 7. In the depicted embodiment, one or more air ventilation systems 8 may be positioned at each of the one or more dry storage boxes 7.

Figure 9D:
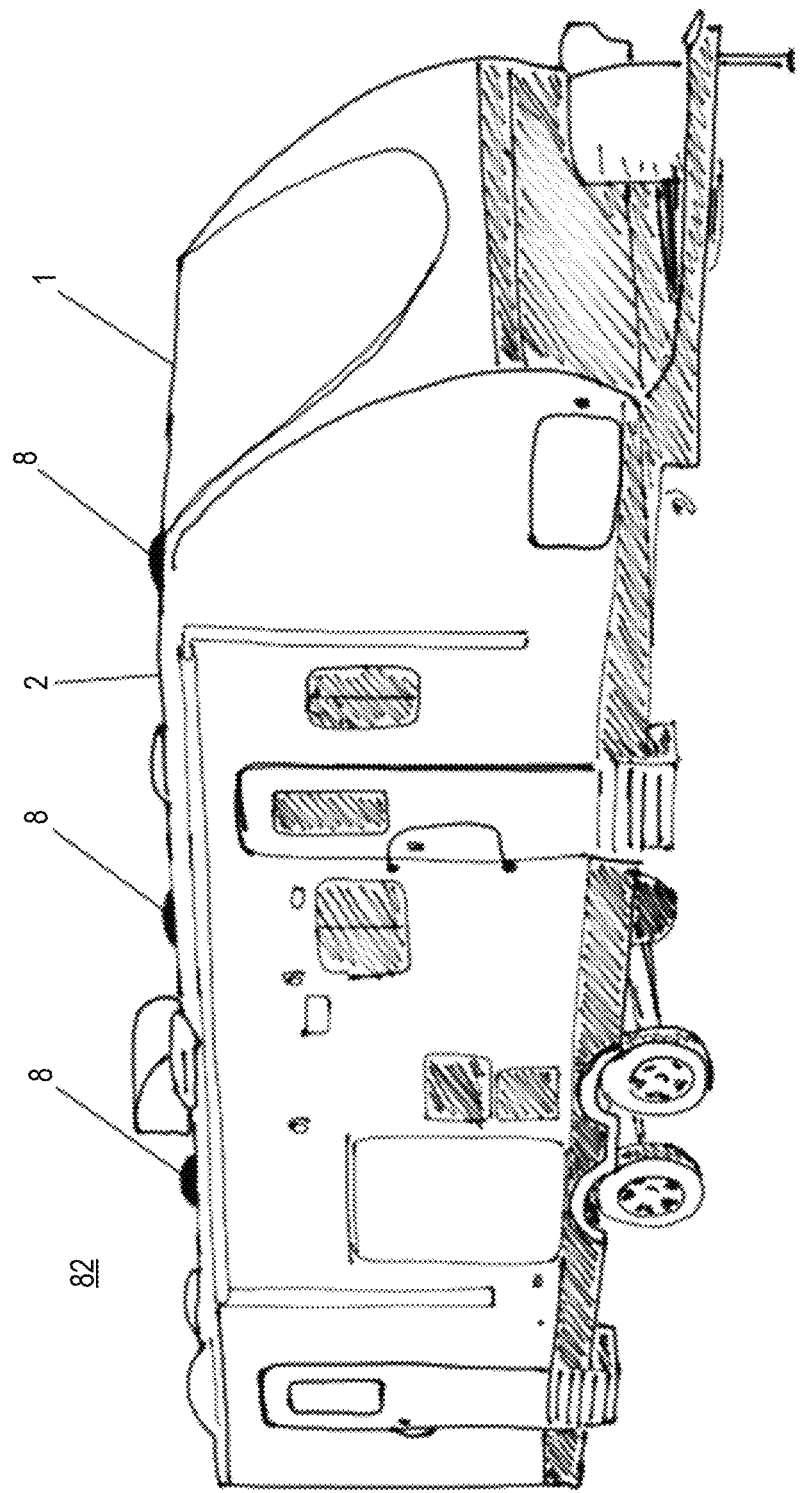

As another example, and as shown at FIG. 9D, the object 1 may be a road vehicle 1, such as an RV 1, including the deck 2 (also referred to as a "roof" or "top," at least in the context of the RV 1). In the depicted embodiment, one or more air ventilation systems 8 may be positioned at the deck 2, e.g., above restroom, shower, and/or bath compartments, and/or other rooms. The one or more air ventilation systems 8 may support persistent natural air circulation/ventilation and a drier ambient climate inside of the RV 1 irrespective of weather conditions (e.g., when the RV 1 is not in use for a relatively lengthy duration).

Figure 9E:
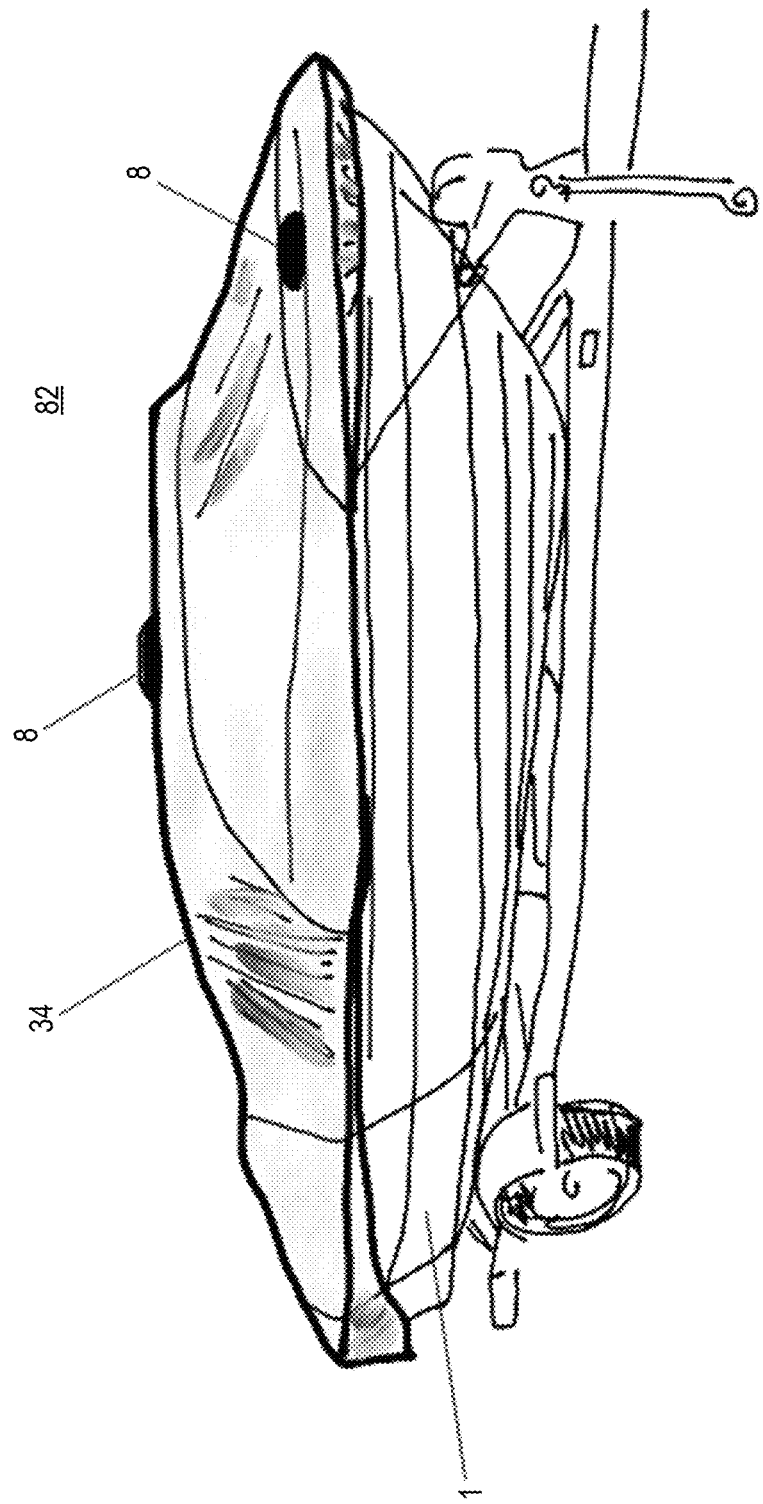
Figure 9F:
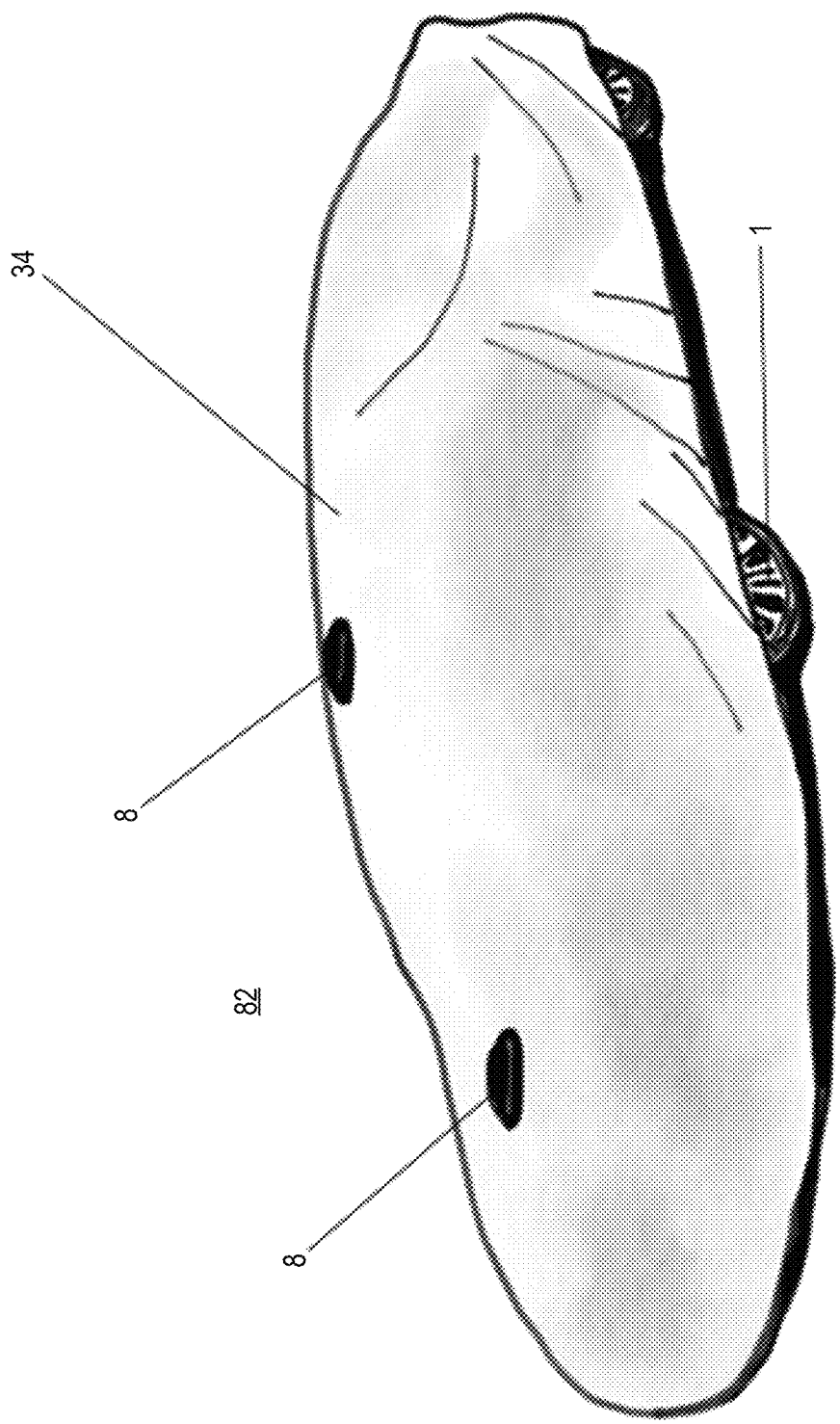
Figure 9G:
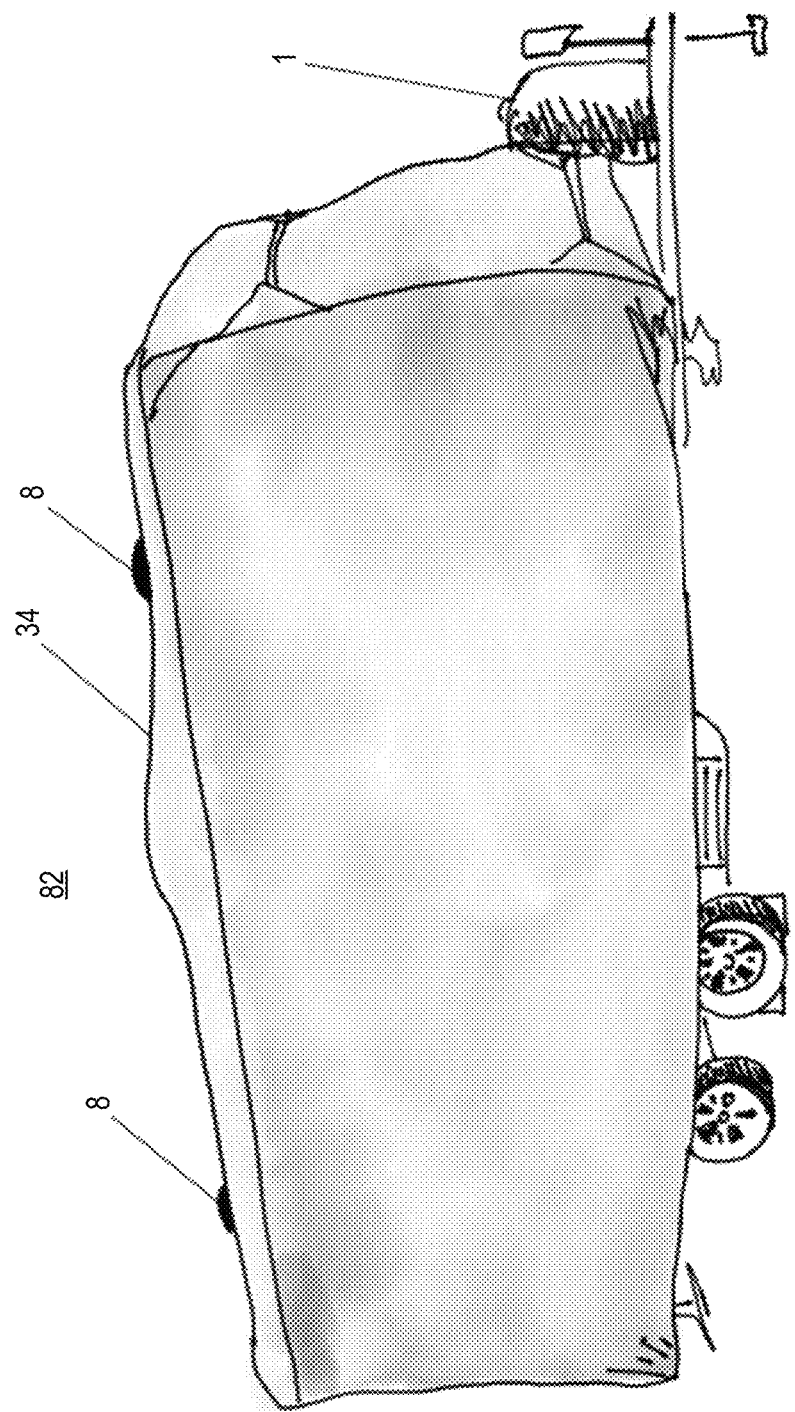

As another example, and as variously shown at FIGS. 9E-9G, the object 1 [e.g., the motorboat 1 (see FIG. 9E), a passenger car 1 (see FIG. 9F), the RV 1 (see FIG. 9G), etc.] may be covered by the cover 34, such as a storage cover 34 (e.g., for seasonal storage). In the depicted embodiments, one or more air ventilation systems 8 may be positioned at the storage cover 34.

In one embodiment, a vent system adapted for persistent air circulation between a delimited interior space of a facility or vehicle and an external environment, the vent system including: a frame; an upper cover; a plurality of exterior air windows formed between the frame and the upper cover; a valve subsystem positioned between the frame and the upper cover, the valve subsystem including: a baffle including a plurality of interior valve windows, the baffle partitioning the vent system into at least two chambers, the at least two chambers including an underlid chamber and a valve chamber; and a plurality of floatable elements positioned within the valve chamber, the plurality of floatable elements freely resting on a plurality of seats, respectively, when no liquid is present within the vent system; and a ventilation circuit configured to protect the delimited interior space from moisture accumulation via reversible opening and closing of the ventilation circuit to control liquid penetration from one or more of precipitation including rain, sleet, and/or snow, seawater and waves therefrom, or freshwater and waves therefrom, the ventilation circuit passing through the plurality of exterior air windows and the valve subsystem, wherein each of the plurality of floatable elements is actuated by liquid flow entering the vent system via the plurality of exterior air windows so as to automatically close and seal the plurality of interior valve windows and thereby prevent the liquid flow from entering the delimited interior space. In one example of the vent system, the vent system further includes wherein the ventilation circuit extends continuously from the external environment, through the plurality of exterior air windows, through the plurality of interior valve windows of the valve subsystem, and to the delimited interior space to permit air circulation between the external environment and the delimited interior space while controlling liquid penetration. In one example of the vent system, optionally including the preceding example of the vent system, the vent system further includes wherein the ventilation circuit prevents liquid penetration via actuation of the valve subsystem. In one example of the vent system, optionally including one or more of the preceding examples of the vent system, the vent system further includes wherein the valve subsystem automatically closes and seals the ventilation circuit. In one example of the vent system, optionally including one or more of the preceding examples of the vent system, the vent system further includes wherein the valve subsystem automatically closes and seals the ventilation circuit via actuation of the plurality of floatable elements. In one example of the vent system, optionally including one or more of the preceding examples of the vent system, the vent system further includes wherein the underlid chamber is in fluidic communication with the delimited interior space, and wherein the valve chamber is in fluidic communication with the external environment. In one example of the vent system, optionally including one or more of the preceding examples of the vent system, the vent system further includes wherein the baffle further includes an annular protective screen. In one example of the vent system, optionally including one or more of the preceding examples of the vent system, the vent system further includes wherein the upper cover includes a domed upper surface, and wherein the plurality of exterior air windows is positioned opposite to and underneath the domed upper surface. In one example of the vent system, optionally including one or more of the preceding examples of the vent system, the vent system further includes a plurality of protective baffles positioned at or adjacent to a portion of the ventilation circuit intaking air from the external environment. In one example of the vent system, optionally including one or more of the preceding examples of the vent system, the vent system further includes wherein the valve subsystem further includes a shutter manually operable to control air flow from the external environment. In one example of the vent system, optionally including one or more of the preceding examples of the vent system, the vent system further includes wherein the shutter includes external threading. In one example of the vent system, optionally including one or more of the preceding examples of the vent system, the vent system further includes a guide, wherein internal threading of the guide receives the external threading of the shutter. In one example of the vent system, optionally including one or more of the preceding examples of the vent system, the vent system further includes wherein the shutter includes a knob. In one example of the vent system, optionally including one or more of the preceding examples of the vent system, the vent system further includes wherein the shutter further includes a handle, the handle coupled to the knob via a seat of the knob. In one example of the vent system, optionally including one or more of the preceding examples of the vent system, the vent system further includes wherein the liquid flow is prevented from entering the delimited interior space when the shutter is in an open position. In one example of the vent system, optionally including one or more of the preceding examples of the vent system, the vent system further includes wherein the shutter is moved from an open position to a closed position via manual rotation of the knob, optionally responsive to air in the external environment being less than a threshold air temperature. In one example of the vent system, optionally including one or more of the preceding examples of the vent system, the vent system further includes wherein the valve subsystem is couplable to multiple configurations of the upper cover. In one example of the vent system, optionally including one or more of the preceding examples of the vent system, the vent system further includes wherein no metal or electrical components are included. In one example of the vent system, optionally including one or more of the preceding examples of the vent system, the vent system further includes a deflector, each of the deflector and the frame including an inner annular ancillary air pipe lip to fit an ancillary air pipe having a length equal to a thickness of a cover of the facility or vehicle on which the vent system is installed, the inner annular ancillary air pipe lips having an equal diameter to one another. In one example of the vent system, optionally including one or more of the preceding examples of the vent system, the vent system further includes wherein the plurality of floatable elements has a density less than a density of water so as to float upon water and automatically close the plurality of interior valve windows upon entry of the water into the valve chamber via the ventilation circuit. In one example of the vent system, optionally including one or more of the preceding examples of the vent system, the vent system further includes an annular protective screen, wherein the annular protective screen is: monolithically formed with the baffle; or formed as a separate component from the baffle such that the baffle is couplable to multiple configurations of the annular protective screen. In one example of the vent system, optionally including one or more of the preceding examples of the vent system, the vent system further includes wherein the annular protective screen is formed as the separate component from the baffle, each of the annular protective screen and the baffle being formed from a silicone or a silicone composite, or wherein the vent system further includes a plurality of gaskets welded to the baffle. In one example of the vent system, optionally including one or more of the preceding examples of the vent system, the vent system further includes wherein the upper domed surface is an elliptical domed surface, and wherein air is naturally convected through the plurality of exterior air windows following an external air current induced by wind or motion of the facility or vehicle. In one example of the vent system, optionally including one or more of the preceding examples of the vent system, the vent system further includes wherein the upper cover and the plurality of exterior air windows are configured to mitigate solid particulates from entering the ventilation circuit. In one example of the vent system, optionally including one or more of the preceding examples of the vent system, the vent system further includes wherein the upper cover includes a plurality of reinforced top strips to provide additional protection to the upper cover when stepped on or impacted by a falling object. In one example of the vent system, optionally including one or more of the preceding examples of the vent system, the vent system further includes wherein the upper cover includes a plurality of inner side ribs, and wherein the frame includes a plurality of half-round slots, the plurality of half-round slots sized so as to receive the plurality of inner side ribs, respectively. In one example of the vent system, optionally including one or more of the preceding examples of the vent system, the vent system further includes wherein the frame is configured a main support for the vent system such that other components of the vent system are coupled to, or positioned relative to, the frame. In one example of the vent system, optionally including one or more of the preceding examples of the vent system, the vent system further includes a deflector, wherein each of the upper cover, the frame, and the deflector includes a plurality of fastening stubs, each fastener stub of the plurality of fastener stubs of the frame aligned with a fastener stub of the plurality of fastening stubs of the upper cover or a fastener stub of the plurality of fastener stubs of the deflector such that the frame is fastened to each of the upper cover and the deflector via the aligned fastener stubs, and wherein a thickness of a cover of the facility or vehicle on which the vent system is installed is small enough such that no additional ancillary air pipe is provided at the cover. In one example of the vent system, optionally including one or more of the preceding examples of the vent system, the vent system further includes wherein the frame includes an inner annular ancillary air pipe lip to receive an ancillary air pipe of a length equal to a thickness of a cover of the facility or vehicle on which the vent system is installed. In one example of the vent system, optionally including one or more of the preceding examples of the vent system, the vent system further includes wherein the baffle further includes an annular protective screen, and wherein the frame includes an inner round plate with an outer annular shelf or terrace, the outer annular shelf or terrace clearance fit to the annular protective screen. In one example of the vent system, optionally including one or more of the preceding examples of the vent system, the vent system further includes wherein the annular protective screen includes a plurality of inner half-round ribs, and wherein a plurality of half-round slots is superimposed on the inner round plate, the plurality of half-round slots clearance fit to the plurality of inner half-round ribs. In one example of the vent system, optionally including one or more of the preceding examples of the vent system, the vent system further includes wherein the frame includes an inner round plate and a plurality of outer stakes extending from the inner round plate, and wherein adjacent pairs of the plurality of outer stakes at least partially form respective seats of the plurality of seats. In one example of the vent system, optionally including one or more of the preceding examples of the vent system, the vent system further includes wherein the frame includes a barrel positioned at a center of the frame. In one example of the vent system, optionally including one or more of the preceding examples of the vent system, the vent system further includes wherein the upper cover includes a plurality of reinforced top strips, and wherein the frame includes a plurality of side fastening stubs for fastening the upper cover to the frame, an orthographic projection of each side fastening stub of the plurality of side fastening stubs at least partially obscured by an orthographic projection of a respective reinforced top strip of the plurality of reinforced top strips. In one example of the vent system, optionally including one or more of the preceding examples of the vent system, the vent system further includes wherein the frame includes an annular bottom slot, and wherein an adhesive sealant is supplied within and throughout the annular bottom slot to seal the vent system to a cover of the facility or vehicle on which the vent system is installed, or wherein a silicone gasket is welded into the annular bottom slot, the cover is a clean and flat surface, and no adhesive sealant is supplied within the annular bottom slot.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. An air ventilation system, comprising:
a frame circumscribing an interior duct;
an upper cover coupled to the frame;
a plurality of exterior air windows, each being formed from the frame and the upper cover, the plurality of exterior air windows permitting air and liquid to freely circulate therethrough; and
a valve subsystem at least partially housed within the upper cover and the frame, the valve subsystem in fluidic communication with the plurality of exterior air windows and the interior duct during at least one mode of operation of the air ventilation system,
wherein the valve subsystem is configured to permit air flow from the plurality of exterior air windows through to the interior duct and prevent liquid flow from reaching the interior duct during the at least one mode of operation of the air ventilation system,
wherein the frame comprises a plurality of protective baffles,
wherein the valve subsystem comprises an annular protective screen, and
wherein each of the plurality of protective baffles and the annular protective screen mitigates entry of solid particulates into the air ventilation system.

2. The air ventilation system of claim 1, wherein the valve subsystem comprises a baffle, which partitions the valve subsystem into at least a valve chamber and an underlid chamber, and
wherein, during the at least one mode of operation of the air ventilation system:
the valve chamber is in fluidic communication with the plurality of exterior air windows; and the underlid chamber is in fluidic communication with the interior duct.

3. The air ventilation system of claim 2, wherein the valve subsystem comprises a plurality of floatable elements freely positioned within the valve chamber,
wherein the baffle comprises a plurality of interior valve windows, and
wherein the plurality of floatable elements is positioned to reversibly seal the plurality of interior valve windows.

4. The air ventilation system of claim 3, wherein, upon water entering the valve chamber, the plurality of floatable elements floats and seals the plurality of interior valve windows such that no liquid is permitted to pass into the interior duct, and
wherein the plurality of floatable elements rests upon a plurality of seats when no liquid is present in the valve chamber and the air flow is permitted to pass through the valve chamber to the underlid chamber and into the interior duct.

5. The air ventilation system of claim 3, wherein the plurality of floatable elements is a plurality of floatable balls, each of the plurality of floatable balls having a first diameter, and
wherein the plurality of interior valve windows is a plurality of circular apertures, each of the plurality of circular apertures having a second diameter, the second diameter less than the first diameter.

6. The air ventilation system of claim 2, wherein the valve subsystem comprises a manual shutter manually rotatable between an open position and a closed position to control the air flow, where the air flow enters the interior duct when the manual shutter is in the open position and the air flow is prevented from entering the interior duct when the manual shutter is in the closed position.

7. The air ventilation system of claim 6, wherein fluidic communication between the underlid chamber and the interior duct is severed when the manual shutter is in the closed position, and
wherein the liquid flow is prevented from reaching the interior duct when the manual shutter is in the open position.

8. The air ventilation system of claim 6, wherein external threading of the manual shutter engages internal threading positioned within the interior duct, such that the manual shutter is manually rotatable between the open position and the closed position.

9. The air ventilation system of claim 1, wherein the upper cover is configured as an elliptical dome.

10. The air ventilation system of claim 1, further comprising a deflector facing an opposite side of the frame from the upper cover, each of the deflector and the frame comprising an inner annular ancillary air pipe lip configured to fit to an ancillary air pipe.

11. The air ventilation system of claim 10, wherein the ancillary air pipe is not present in the air ventilation system and the deflector is fastened directly to the frame.

12. The air ventilation system of claim 10, further comprising the ancillary air pipe, the ancillary air pipe fit into each of the inner annular ancillary air pipe lips and extending between the frame and the deflector,
wherein the ancillary air pipe is cut to a length equal to a thickness of a cover or other surface of either a facility or a watercraft or other vehicle.

13. The air ventilation system of claim 1, further comprising:
a deflector facing an opposite side of the frame from the upper cover; and
a plurality of fasteners positioned to removably fasten each of the frame and the deflector to a cover or other surface of either a facility or a watercraft or other vehicle.

14. The air ventilation system of claim 1, wherein the frame comprises an annular bottom slot suppliable with an adhesive sealant or a gasket, such that, upon installation of the air ventilation system to a surface, sealing is to be provided, by the adhesive sealant or the gasket, between the frame and the surface.

15. The air ventilation system of claim 1, wherein the at least one mode of operation comprises:
a first mode of operation wherein the air flow is permitted; and
a second mode of operation wherein the liquid flow enters the valve subsystem and is prevented from entering the interior duct.

16. The air ventilation system of claim 15, wherein the first mode of operation is actuated when less than a threshold amount of liquid is present in the air ventilation system, and
wherein the second mode of operation is actuated when greater than or equal to the threshold amount of liquid is present in the air ventilation system.

17. The air ventilation system of claim 16, wherein the air flow is prevented from entering the interior duct during the second mode of operation.

18. The air ventilation system of claim 16, wherein the liquid flow is prevented from entering the interior duct during each of the first and second modes of operation.

19. An air ventilation system, comprising:
a frame circumscribing an interior duct;
an upper cover coupled to the frame;
a deflector facing an opposite side of the frame from the upper cover;
an ancillary air pipe;
a plurality of exterior air windows, each being formed from the frame and the upper cover, the plurality of exterior air windows permitting air and liquid to freely circulate therethrough; and
a valve subsystem at least partially housed within the upper cover and the frame, the valve subsystem in fluidic communication with the plurality of exterior air windows and the interior duct during at least one mode of operation of the air ventilation system,
wherein the valve subsystem is configured to permit air flow from the plurality of exterior air windows through to the interior duct and prevent liquid flow from reaching the interior duct during the at least one mode of operation of the air ventilation system,
wherein each of the deflector and the frame comprises an inner annular ancillary air pipe lip configured to fit to the ancillary air pipe, and
wherein the ancillary air pipe is fit into each of the inner annular ancillary air pipe lips and extends between the frame and the deflector.

20. An air ventilation system, comprising:
a frame circumscribing an interior duct;
an upper cover coupled to the frame;
a plurality of exterior air windows, each being formed from the frame and the upper cover, the plurality of exterior air windows permitting air and liquid to freely circulate therethrough; and
a valve subsystem at least partially housed within the upper cover and the frame, the valve subsystem in fluidic communication with the plurality of exterior air windows and the interior duct during at least one mode of operation of the air ventilation system, wherein the valve subsystem is configured to permit air flow from the plurality of exterior air windows through to the interior duct and prevent liquid flow from reaching the interior duct during the at least one mode of operation of the air ventilation system, wherein the valve subsystem comprises:
- a baffle comprising a plurality of interior valve windows, the baffle partitioning the valve subsystem into at least a valve chamber and an underlid chamber; and
- a plurality of floatable elements freely positioned within the valve chamber, the plurality of floatable elements positioned to reversibly seal the plurality of interior valve windows, and wherein, during the at least one mode of operation of the air ventilation system:
- the valve chamber is in fluidic communication with the plurality of exterior air windows; and
- the underlid chamber is in fluidic communication with the interior duct.

* * * * *